(12) United States Patent
Taguchi et al.

(10) Patent No.: US 6,551,529 B2
(45) Date of Patent: Apr. 22, 2003

(54) DICHROMATIC POLARIZING ELEMENT AND PRODUCTION METHOD THEREOF

(75) Inventors: Keiichi Taguchi, Kanagawa (JP); Naoyuki Nishikawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/951,677

(22) Filed: Sep. 14, 2001

(65) Prior Publication Data

US 2002/0084447 A1 Jul. 4, 2002

(30) Foreign Application Priority Data

Sep. 19, 2000 (JP) ......................... 2000-283896

(51) Int. Cl.[7] .............. F21V 9/14; G02B 5/30
(52) U.S. Cl. ............... 252/585; 359/492; 427/163.1
(58) Field of Search ............... 252/585; 359/492; 427/163.1

(56) References Cited

U.S. PATENT DOCUMENTS

| 2,400,877 | A | | 5/1946 | Dreyer |
| 2,544,659 | A | | 3/1951 | Dreyer |
| 5,700,296 | A | * | 12/1997 | Ogino et al. ............ 252/585 |
| 5,717,080 | A | * | 2/1998 | Kitaguchi et al. ........ 534/830 |
| 6,399,752 | B1 | * | 6/2002 | Ohta et al. .............. 252/585 |

FOREIGN PATENT DOCUMENTS

| WO | WO94/28073 | 12/1994 |

* cited by examiner

*Primary Examiner*—Philip Tucker
(74) *Attorney, Agent, or Firm*—Burns, Doane, Swecker & Mathis, LLP

(57) ABSTRACT

A dichromatic polarizing element comprising a water-soluble organic dichromatic dye selected from the group consisting of a bisazo compound of a specific structure, the tautomer thereof, and the salts of them, wherein the dichromatic dye comprises the aggregates thereof oriented to a definite direction such that the dye can polarize a light passed therethrough, and a method of producing the polarizing element orienting the aggregates by a specific method are provided.

14 Claims, 1 Drawing Sheet

Conventional Polarizer

Polarizer of the Invention

Conventional Polarizer          Polarizer of the Invention

DICHROMATIC POLARIZING ELEMENT AND PRODUCTION METHOD THEREOF

FIELD OF THE INVENTION

The present invention relates to a dichromatic polarizing element having a high degree of polarization using a water-soluble organic dichromatic dye selected from the group consisting of a bisazo compound, the tautomer thereof, and the salts thereof.

Furthermore, the invention relates to a method of producing a long dichromatic polarizing element capable of obtaining dichromatic polarizing element chips with a good yield.

BACKGROUND OF THE INVENTION

A polarizer used for a liquid crystal display device is hitherto been obtained by holding between protective films such as triacetyl cellulose a polarizing element obtained by a method of dissolving or adsorbing a dichromatic molecule such as iodine or a dye, etc., in or on an orientation controller made of a macromolecular substance such as polyvinyl alcohol, etc., and stretching the film in one direction to arrange the dichromatic molecule, or a method of adsorbing the above-described dichromatic molecule to a film stretched to a uniaxial direction.

However, by the above-described method, the orientation controller for orienting the dichromatic molecule must be stretched, and thus, there is a restriction that only a polarizer oriented in only one direction can be produced.

On the other hand, recently, as described in JP-A-7-261024 (The term "JP-A" as used herein means an "unexamined published Japanese patent application"), a polarizer, which requires no stretching step and has an optional polarization axis, formed by forming a molecular layer showing a dichromatic property on a layer having a photoactive molecule formed on a substrate is reported, but there are problems that because the dichromatic molecule is oriented to a specific direction by the irradiation of light, a very long time is required and long polarizer cannot be produced continuously and also dichromatic molecule orientation is poor in uniformity. Furthermore, the above-described polarizer is low in the polarization degree as compared with the conventional polarizers, and thus cannot be practically used by any possibility.

Also, a method of, after applying a rubbing treatment of rubbing with a cloth, a paper, etc., the surface of a glass or a high molecular film in one direction, adsorbing a dichromatic molecule on the surface is proposed (see, J. F. Dreyer, "Journal of Physics and Colloid Chemistry", Page 52, 808 (1948)). However, in the method, a continuous treatment of a long sheet of polarizer is not described, and there are problems that under a high temperature and high humidity, the high molecular film oriented by the rubbing treatment is relaxed, the orientation of the dichromatic molecule is disturbed, the polarization degree is lowered.

Furthermore, in JP-A-3-54506 and JP-A-3-58004, it is proposed to prepare a polarizer by rubbing a triacetyl cellulose film or a polyethylene terephthalate film and adding a dye, but in the method, the polarization degree is low.

On the other hand, in U.S. Pat. Nos. 2,400,877 and 2,544,659, a method of producing a light polarizing element by coating a solution of a dichromatic material on the surface of a substrate, simultaneously with evaporating the solvent from the surface of the substrate, orienting the molecule of the dichromatic material as a nematic phase, and moderately solidifying the molecule in the oriented state is proposed. However, these known light polarizing elements have a low polarization degree, are insufficient in the heat resistance, and cannot be endure for the practical use.

Recently, about a liquid crystal display device, thinning and light-weighting have been progressed, and all members in relation to the display device has been small-sized, thinned, and light-weighted. However, various attempts have been tried as described above, but the polarizer having the desired performance has not yet been obtained at present.

As the conventional orientation controllers, in the method of preparing a polarizer using a polyvinyl alcohol film, etc., as described above, the stretched polyvinyl alcohol is liable to be splitted to the stretched direction, whereby there is a problem that a protective layer must be formed to both side of the polarizer, which increases the thickness of whole the liquid crystal display device. Furthermore, in the conventional method of preparing a polarizer by stretching a polyvinyl alcohol, because the stretched polyvinyl alcohol film is shrunk by heat and humidity, there is a problem that an adhesive existing between the glass surface of a liquid crystal cell and the polarizer is released.

Moreover, for preparing a long polarizer, the polyvinyl alcohol film is oriented to only the lengthwise direction or the width direction, whereby the polarization axis inevitably becomes parallel with or vertical to the lengthwise direction and thus, there is a problem that in the case of attaching the polarizer to a liquid crystal display device, the polarizer is stamped to a rectangle so that the polarization axis becomes the direction of 45 degree, which greatly reduces the yield, and thus it has been desired to solve these problems.

SUMMARY OF THE INVENTION

An object of the invention is to provide a dichromatic polarizing element, which can be simply produced, has a high polarization degree, and can cope with small-sizing, thinning, and light-weighting of a liquid crystal display device.

Another object of the invention is to provide a method of producing a long dichromatic polarizing element capable of obtaining the chips of the dichromatic polarizing elements as described above with a good yield.

According to the present invention, the dichromatic polarizing element and the production method thereof of the following constitutions are provided and the above-described objects of the invention are attained thereby.

1. A dichromatic polarizing element comprising a water-soluble organic dichromatic dye selected from the group consisting of a bisazo compound represented by following formula (1), the tautomer thereof, and the salts thereof, wherein the dichromatic dye comprises aggregates oriented to a definite direction such that the dye can polarize a light passing therethrough,

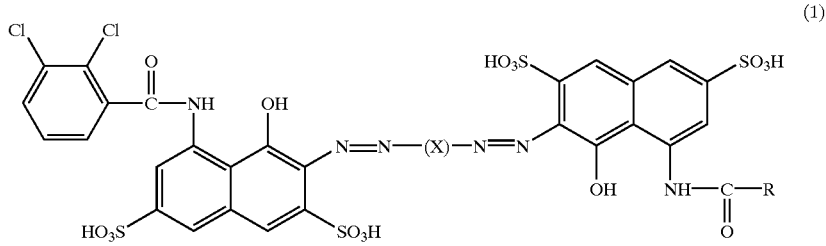

wherein R represents an unsubstituted or substituted phenyl group or an unsubstituted or substituted heteroaryl group, and X represents an unsubstituted or substituted phenylene group.

2. The dichromatic polarizing element described in the above-described constitution 1, wherein the bisazo compound represented by the formula (1) is a bisazo compound represented by following formula (2),

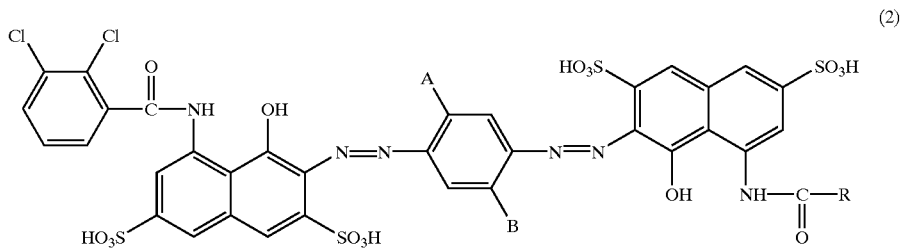

wherein R represents an unsubstituted or substituted phenyl group or an unsubstituted or substituted heteroaryl group, and A and B, which may be the same or different, each represents a group or an atom selected from the class consisting of a hydrogen atom, an alkyl group having from 1 to 4 carbon atoms, an alkoxy group having from 1 to 4 carbon atoms, and a halogen atom.

3. The dichromatic polarizing element described in the above-described constitution 2, wherein A and B are a same alkoxy group having from 1 to 4 carbon atoms.

4. The dichromatic polarizing element described in the above-described constitution 3, wherein A and B are a methoxy group.

5. The dichromatic polarizing element described in the above-described constitution 4, wherein R is a phenyl group substituted by one or more halogen atom.

6. The dichromatic polarizing element described in the above-described constitution 5, wherein R is a phenyl group substituted by one or more chlorine atom.

7. The dichromatic polarizing element described in the above-described constitution 2, wherein the bisazo compound represented by the above-described formula (2) is the bisazo compound selected from the group consisting of the compounds represented by following formula (2-1), (2-2), (2-3), (2-4) or (2-5):

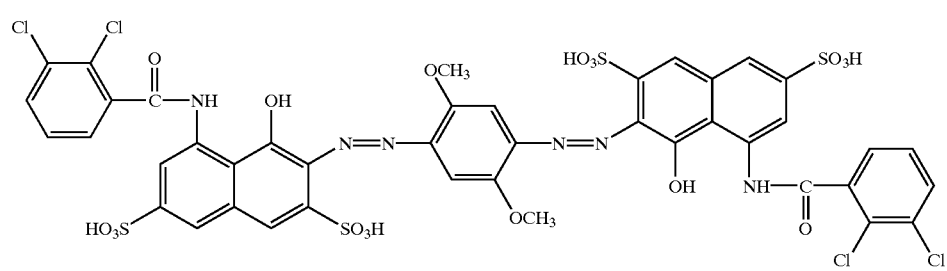

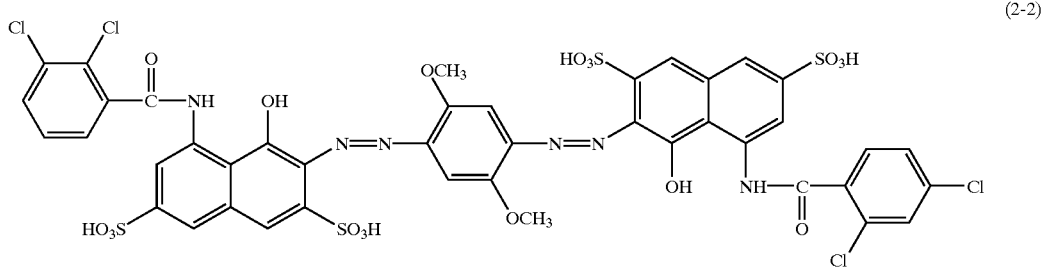
(2-2)

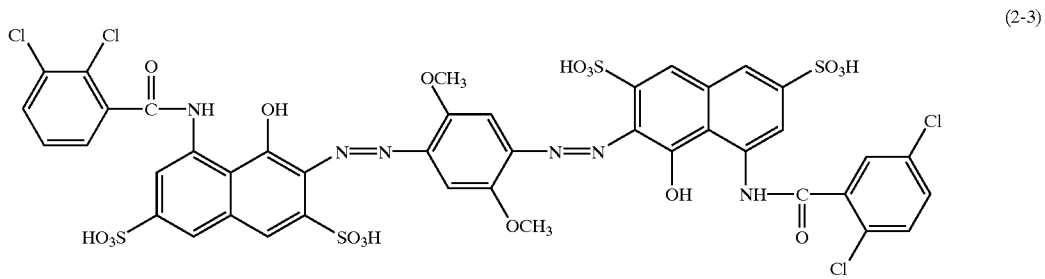
(2-3)

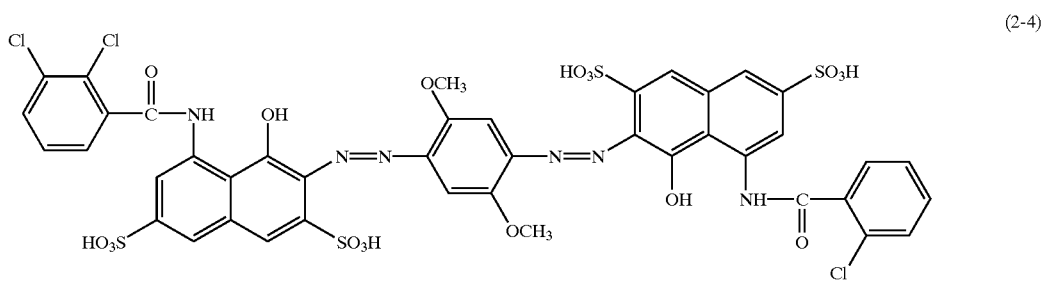
(2-4)

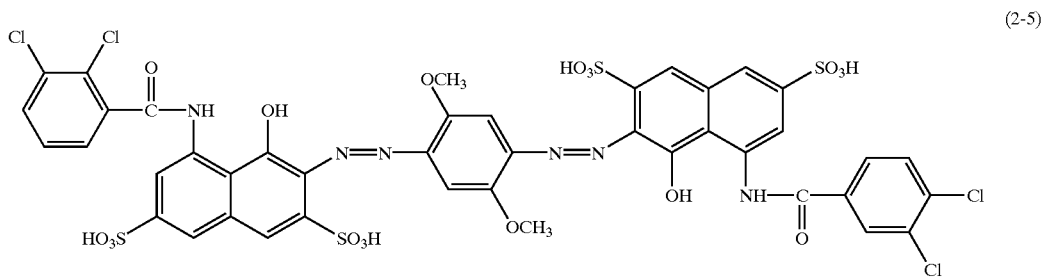
(2-5)

8. A method of producing the dichromatic polarizing element described in one of the above-described constitutions 1 to 7, which comprises orienting the aggregates of the dichromatic dye by a force capable of orienting the aggregates to a definite direction such that the dichromatic dye can polarize a light passing therethrough, and removing the force capable of orienting while leaving the aggregates as in the oriented state.

9. The production method described in the above-described constitution 8, wherein said dichromatic dye is the bisazo compound selected from the group consisting of the compounds represented by following formula (2-1), (2-2), (2-3), (2-4) or (2-5):

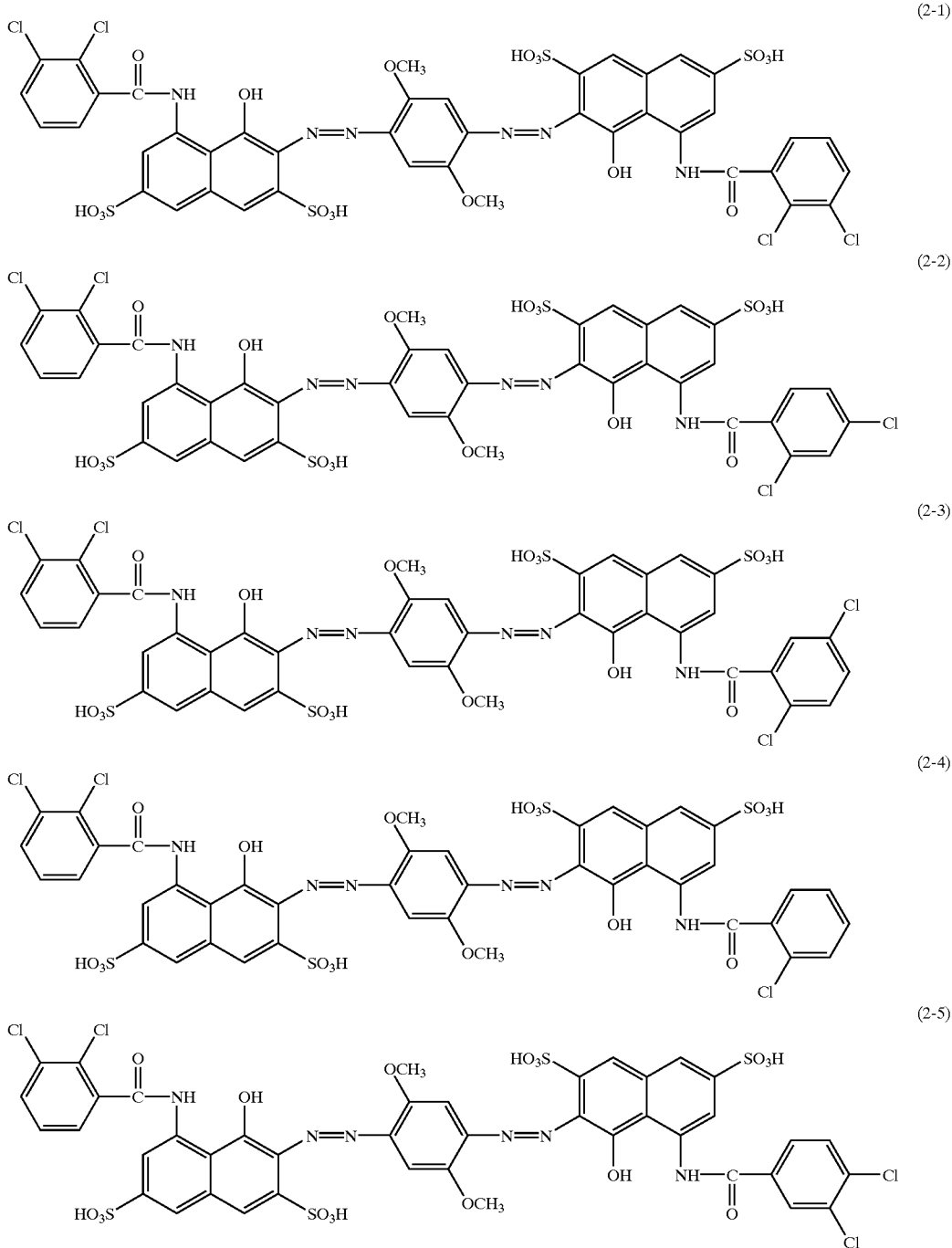

10. The production method described in the above-described constitution 8, wherein the force capable of orienting is a shearing force.
11. A method of producing the dichromatic polarizing element described in one of the above-described constitutions 1 to 7, which comprises coating a solution of dispersing the aggregates of the dichromatic dye on a support by a die coating method, a blade coating method or a bar coating method.
12. The method of producing the dichromatic polarizing element described in the above-described constitution 11, which comprises coating a solution of dispersing the aggregates of the dichromatic dye on a support by a bar coating method.
13. The method of producing the dichromatic polarizing element described in the above-described constitution 12 wherein a bar used for the bar coating method is rotated to be disposed at a desired angle to the lengthwise direction of the support at coating the solution, whereby the aggregates of the dichromatic dye have an absorption axis of the desired angle.
14. The method of producing the dichromatic polarizing element described in the above-described constitution 11, wherein the concentration of the dichromatic dye in the solution is from 1 to 50%.

DETAILED DESCRIPTION OF THE INVENTION

Figure 1:
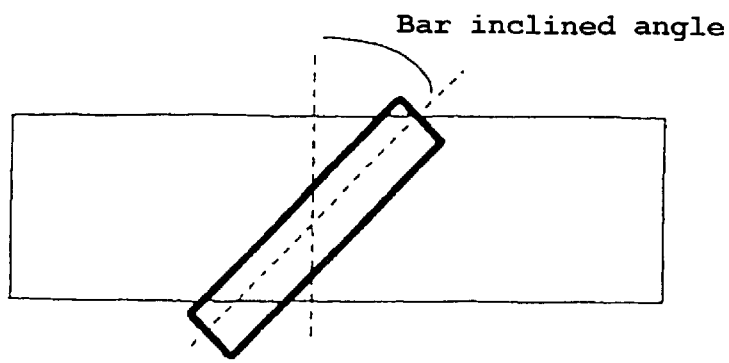
FIG. 1 is a schematic plain view showing the inclination of a bar at bar coating.

Then, the present invention is described in detail.
(Dichromatic Polarizing Element and Production Method Thereof)

The dichromatic polarizing element of the invention comprises a water-soluble organic dichromatic dye (coloring matter) and the dichromatic polarizing element comprises the aggregates of the dye oriented to a definite direction such that the dye can polarize a light passing through the dye.

First, the dichromatic dye is explained.
(Dichromatic Dye)

The dichromatic dye used in the invention is a bisazo compound represented by the above-described formula (1) or the bisazo compound represented by the above-described formula (2), which is the more specific concept than the formula (1), obtained by modifying the acyl group on the amino group of the aminonaphthalenesulfonic acid portion existing in a bisazo compound.

In the above-described formula (1), R represents an unsubstituted or substituted phenyl group or an unsubstituted or substituted heteroaryl group. X represents an unsubstituted or substituted phenylene group.

In the above-described formula (2), R represents an unsubstituted or substituted phenyl group or an unsubstituted or substituted heteroaryl group. A and B, which may be the same or different, each represents a group or an atom selected from the class consisting of a hydrogen atom, an alkyl group having from 1 to 4 carbon atoms, an alkoxy group having from 1 to 4 carbon atoms, and a halogen atom.

When R is a substituted phenyl group, the preferable substituent includes a halogen atom, a trifluoromethyl group, an alkyl group, an alkoxy group, an alkylcarbonyl group, an aryl group, an aryloxy group, an arylcarbonyl group, a cyano group, a hydroxy group, etc., and the more preferable substituent includes a halogen atom such as fluorine, chlorine, etc., a trifluoromethyl group, a cyano group, an alkyl group having from 1 to 4 carbon atoms, or an alkoxy group having from 1 to 4 carbon atoms. In these substituents, a halogen atom is particularly preferred and in the halogen atoms, chlorine is most preferred. Also, the case that R is an unsubstituted phenyl group is also similarly preferred.

When R is a phenyl group substituted by chlorine, the preferred number of chlorine atoms existing on the phenyl group is from 1 to 3, and is more preferably 1 or 2. When R is a monochloro-substituted phenyl group, the substituted position of the chlorine atom is preferably the o-, m- or p-position but the o-position is particularly preferred. When R is a dichloro-substituted phenyl group, the preferred examples include a 2,4-dichlorophenyl group, a 3,4-dichlorophenyl group, a 2,3-dichlorophenyl group, and a 2,5-dichlorophenyl group, and in these groups, the 2,4-dichlorophenyl group, the 2,5-dichlorophenyl group, and the 2,3-dichlorophenyl group are more preferred, and the 2,4-dichlorophenyl group is particularly preferred.

Preferred examples in the case that R is a heteroaryl group include a pyridyl group, a thienyl group, a furyl group, quinolyl group, and an isoquinolyl group. When the heteroaryl group has a substituent, examples of the suitable substituent include a halogen atom such as fluorine, chlorine, bromine, and iodine, a trifluoromethyl group, an alkyl group, an alkoxy group, an aryl group, a cyano group, and a hydroxy group, but the preferred substituent is a halogen atom such as fluorine, chlorine, etc., and an alkyl group having from 1 to 4 carbon atoms.

When R represents an unsubstituted or substituted heteroaryl group, the preferred specific examples of R include a 3-pyridyl group, a 4-pyridyl group, a 2-thienyl group, a 2-furyl group, and a 3-quinolyl group, and particularly preferred examples are a 3-pyridyl group and a 3-quinolyl group.

When X is a substituted phenyl group, as the substituent, there are the illustrated groups as the preferred substituents of the case that R is the substituted phenyl group.

In the formula (2), A and B, which may be the same or different, each represents a substituent selected from the class consisting of a hydrogen atom, an alkyl group having from 1 to 4 carbon atoms, an alkoxy group having from 1 to 4 carbon atoms, and a halogen atom. As the preferred examples of the alkyl group, there are methyl, ethyl, and butyl; as the preferred examples of the alkoxy group, there are methoxy, ethoxy, and butoxy; and as the preferred examples of the halogen atom, there are fluorine, chlorine, and bromine. In these substituents, the alkyl group and the alkoxy group are preferred, and the alkoxy group is particularly preferred.

A and B may be the same or different, but it is preferred that they are the same. In this case, it is preferred that A and B are an alkoxy group having from 1 to 4 carbon atoms, and it is most preferred that A and B are a methoxy group.

The preferred combinations of the substituents of R, A, and B in the compounds represented by the formula (2) are shown in Table 1 below. In these combinations, the combinations (a), (b), (c), (d), (e), (f), (g), (h), (i), (j), (k), and (o) are preferred, and the combinations (c), (d), (e), (f), (g), (h), (i), (j), and (k) are particularly preferred.

TABLE 1

| Combination | R | A | B |
| --- | --- | --- | --- |
| (a) | Phenyl | Methyl | Methyl |
| (b) | Phenyl | Methoxy | Methoxy |
| (c) | Monochlorophenyl | Methyl | Methyl |
| (d) | Monochlorophenyl | Methoxy | Methoxy |
| (e) | Monochlorophenyl | Ethoxy | Ethoxy |
| (f) | Dichlorophenyl | Methyl | Methyl |
| (g) | Dichlorophenyl | Methoxy | Methoxy |
| (h) | Dichlorophenyl | Ethoxy | Ethoxy |
| (i) | Dichlorophenyl | Hydrogen | Hydrogen |
| (j) | Dichlorophenyl | Halogen | Hydrogen |
| (k) | Dichlorophenyl | Methoxy | Methyl |
| (l) | 3-Pyridyl | Methyl | Methyl |
| (m) | 3-Pyridyl | Methoxy | Methoxy |
| (n) | 3-quinolyl | Methyl | Methyl |
| (o) | 3-quinolyl | Methoxy | Methoxy |

The ionic group existing in the bisazo compound may form a salt with a proper counter ion, specifically a cation.

It is preferred that the cation is not substantially toxicity and does not independently have a significant pharmacological activity. Specific example of the salt includes alkali metal salts such as a sodium salt, a potassium salt, etc.; alkaline earth metal salts such as a magnesium salt, etc.; salts of light metals of the group IIIA of the periodic table including aluminum; ammonium salts; and the salts with organic primary, secondary, and tertiary amines.

In these salts, sodium salts, potassium salts, ammonium salts, and organic amine salts are particularly preferred. The preferred examples of the organic amines include triethylamine, tris(hydroxymethyl)aminomethane, and the derivatives of amino acid and oligopeptide.

Also, according to the using mode of the bisazo compound, it is possible to use the bisazo compound as the form of the salt thereof which cannot pharmacologically allowed. Examples of such a salt are the salts containing barium, titanium, zinc, etc.

Then, the synthesis method of the bisazo compound used in the invention is explained.

The compound of the formula (2) described above can be easily produced from known starting materials or an intermediate almost according to the methods described in U.S. Pat. Nos. 3,754,923 and 3,671,263 or the methods described, for example, in Yutaka Hosoda, "Theoretical Production Dye Chemistry", published by Gihodo K.K., etc.

For example, the compound of the formula (2) can be produced by coupling the compound represented by the following intermediate 1 with the diazonium salt prepared from the compound represented by the following formula (3) (in the formula, A and B have the same definitions as described above) to product the monoazo compound represented by the following formula (4) (in the formula, A and B have the same definitions as described above), thereafter, reducing the nitro group in the monoazo compound to convert the compound to the amine compound represented by the following formula (5) (in the formula, A and B have the same definitions as described above), finally, coupling the diazonium salt prepared from the amine compound with the compound represented by the following formula (6) (in the formula, R has the same definitions as described above), and after, if necessary, subjecting the reaction system to salting out, collecting the precipitates deposited by filtration, Intermediate 1

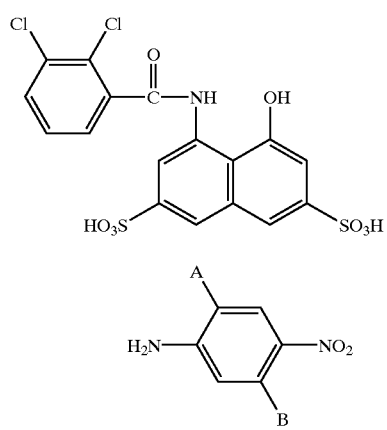

(3)

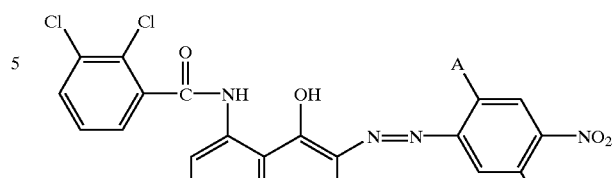

(4)

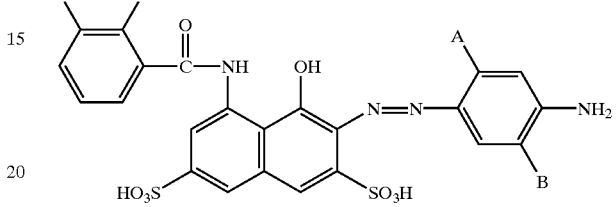

(5)

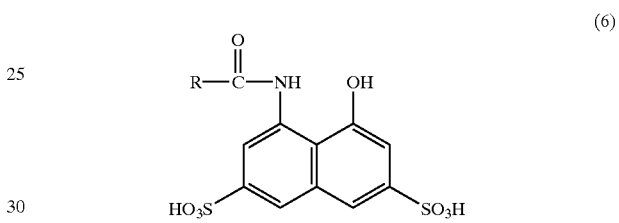

(6)

In the series of steps, it is possible to continuously carry out the coupling step and the reduction step without isolating the nitro compound represented by the formula (4). As a matter of course, the compound of the formula (2) can be also produced by changing the order of carrying out the coupling reactions, that is, first by coupling the diazonium salt prepared from the compound represented by the formula (3) with the compound represented by the formula (6), after reducing the nitro group in the reaction product, converting the product to the diazonium salt and then coupling the diazonium salt with the intermediate 1. In addition, in the explanation of the production method, the sulfonic acid group was described as the form of a free acid, but the reaction is carried out in the state of a salt formed with a proper counter ion and a desired bisazo compound may be isolated. In this case, from the point of easiness of the availability of the raw materials and the reaction reagents, it is preferred to react as the sodium salt and isolate.

Also, in the case that the desired bisazo compound formed a salt with other counter ion is necessary, the compound can be prepared by ion-exchanging the corresponding sodium salt.

Then, specific examples of the bisazo compound used in the invention are shown below (they are shown as the forms of the sodium salts except the compounds 11 and 12), but the invention is not limited to these compounds.

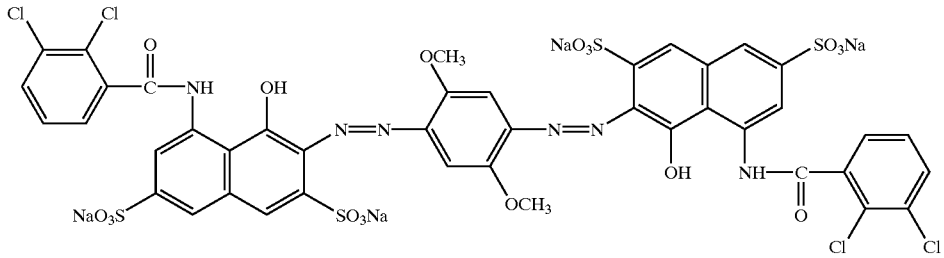
Compound 1
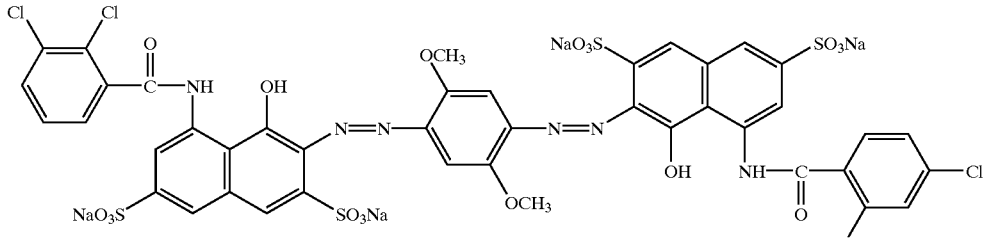
Compound 2
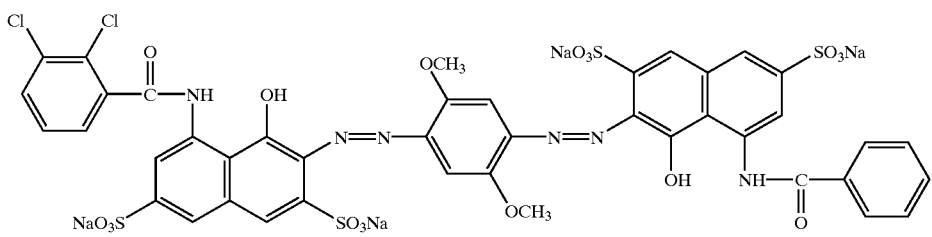
Compound 3
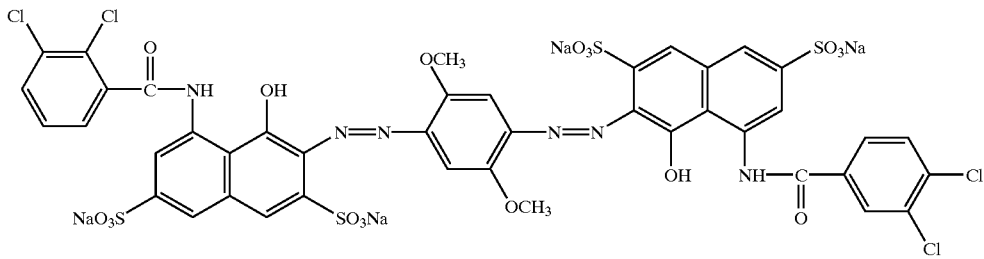
Compound 4
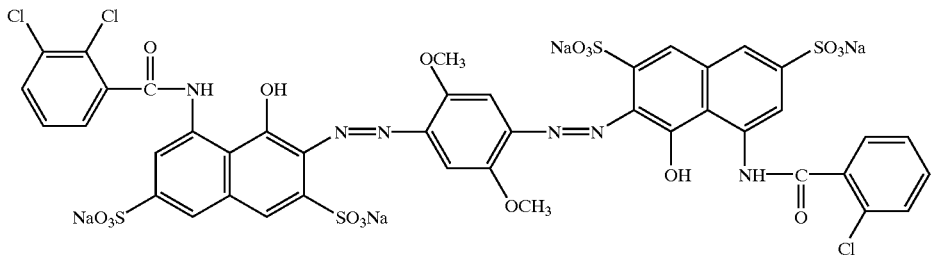
Compound 5
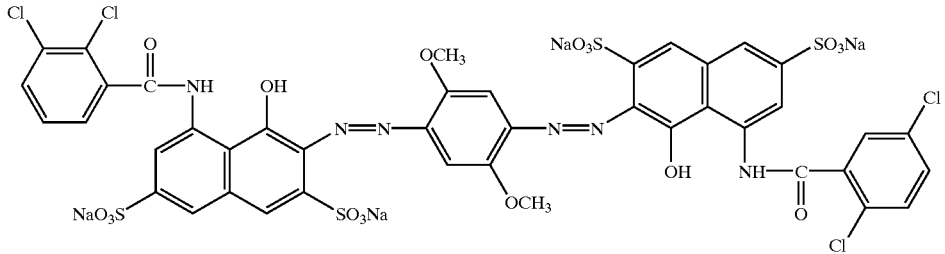
Compound 6

-continued
Compound 7
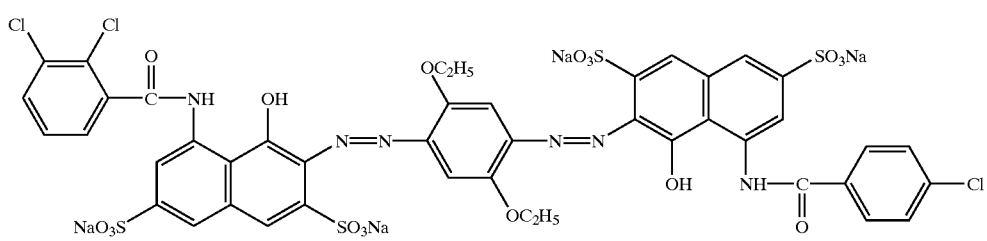
Compound 8
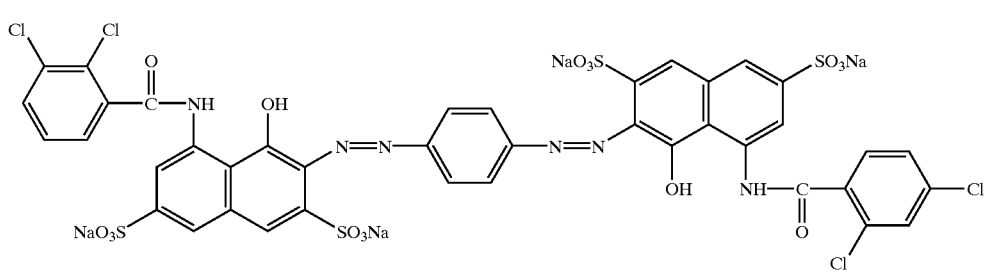
Compound 9
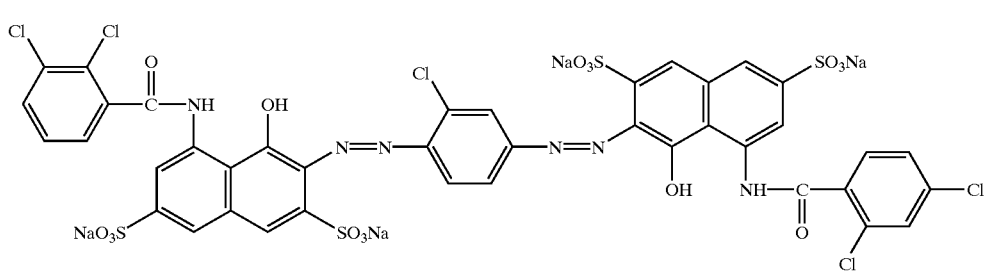
Compound 10
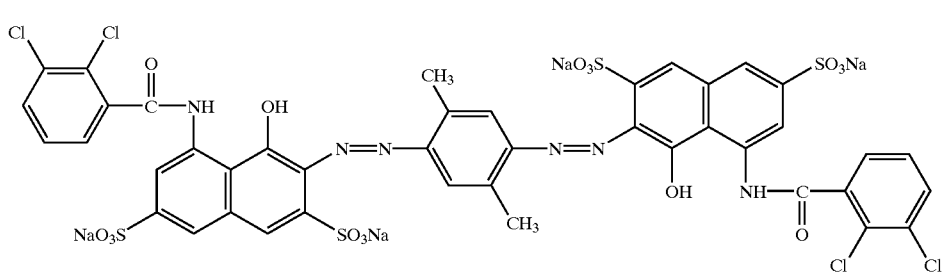
Compound 11
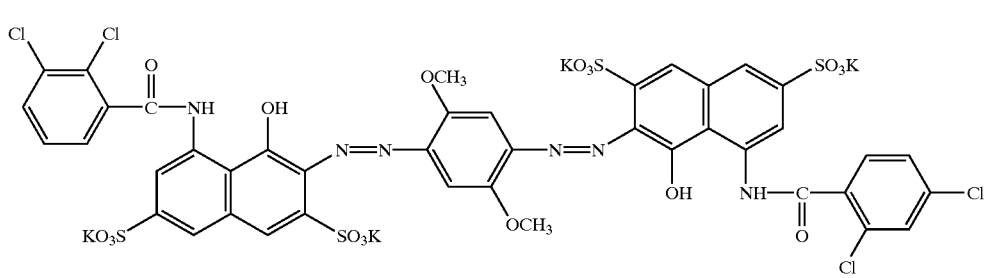
Compound 12
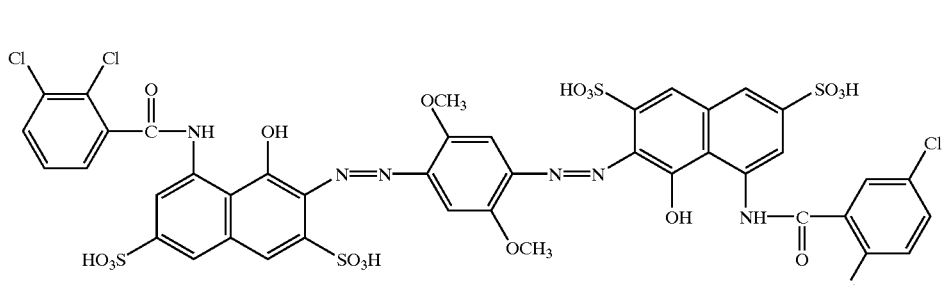
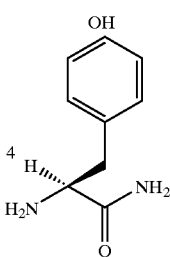

Then, the synthesis methods of the specific compounds are described.

(Synthesis of Compound 1)

The synthesis method of the compound 1 is explained in detail. First, the synthesis course of the compound 1 is shown below.

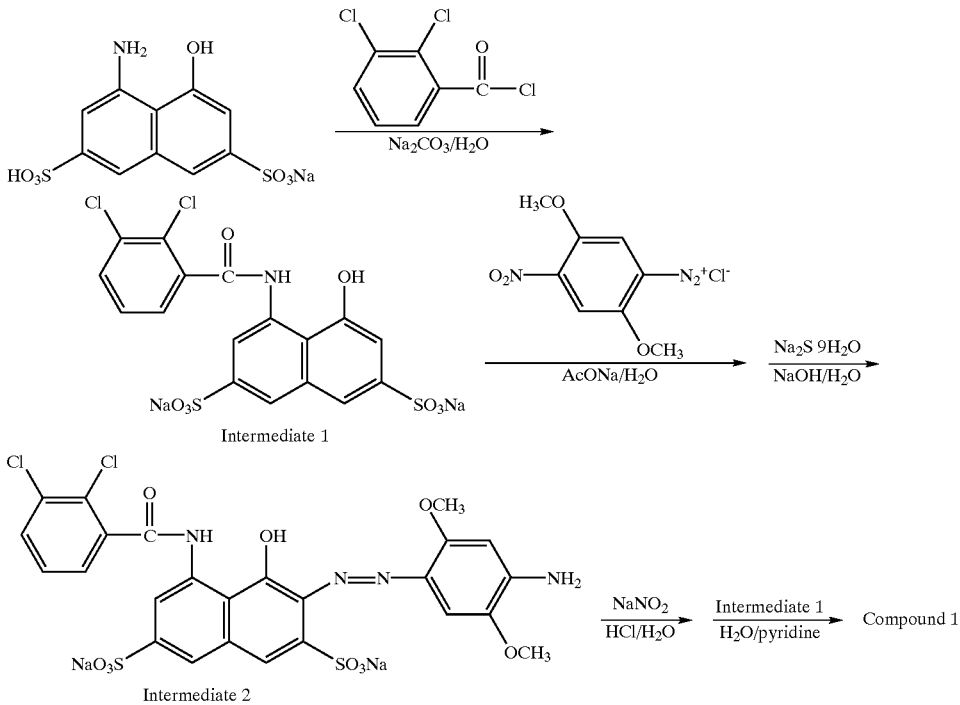

(1) Synthesis of Intermediate 1

The intermediate 1 was synthesized using an improved method of the Schotten-Baumann method.

In a deionized water (200 ml) were dissolved 8-amino-3,6-disulfo-1-naphthol (H acid, 34.2 g, 100 mmol as the monosodium salt), sodium hydroxide (5.0 g, 125 mmol), and sodium carbonate (37.0 g, 350 mmol), and while blowing in a nitrogen gas, a THF (20 ml) solution of 2,3-dichlorobenzoyl chloride (23.1 g, 110 mmol) was added dropwise to the solution at a temperature of from 35 to 40° C. over a period of about one hour.

After vigorously stirring the reaction mixture for one hour at the same temperature, the temperature was raised to 80° C. and further the mixture was vigorously stirred for one hour. Then, after adding thereto 250 ml of a 10% aqueous solution of sodium chloride and allowing to cool the mixture to room temperature, precipitates formed were collected by filtration, washed with 10% aqueous solution of sodium chloride and then acetonitrile, followed by drying to obtain 40.0 g of the desired intermediate 1 (yield 75% as the disodium salt).

(2) Synthesis of Intermediate 2

In a mixed solvent of deionized water (20 ml) and concentrated hydrochloric acid (5.1 ml) was dissolved 2,5-dimethoxy-4-nitroaniline (4 g, 20 mmol) and while ice-cooling, a deionized water (10 ml) solution of sodium nitrite (1.56 g, 22 mmol) was added to the solution. Then, while ice-cooling, the reaction mixture was stirred for 60 minutes. The aqueous solution of the diazonium salt thus prepared was added to a deionized water solution (200 ml) of the intermediate 1 (12 g, 22.2 mmol as the disodium salt) and sodium acetate (5.5 g) at 10° C. After stirring the reaction mixture for one hour at 20° C., the temperature was raised to 45° C., and the reaction mixture was further stirred for one hour.

To the reaction mixture were added a 20% aqueous solution (9 ml) of sodium hydroxide and then sodium sulfide nonahydrate (19.2 g, 80 mmol), and the mixture was stirred for one hour at 45° C. After stirring, isopropyl alcohol (50 ml) was added to the mixture and then acetic acid (9 ml) was added to neutralize the reaction mixture, whereby precipitates were deposited. Furthermore, after adding a saturated aqueous solution of sodium acetate (30 ml), the precipitates deposited were collected by filtration, and washed with a mixed solvent of a 10% aqueous solution of sodium acetate and isopropyl alcohol (1:1 by volume ratio) and then isopropyl alcohol.

The crude product of the intermediate 2 thus obtained was suspended in a mixed solvent of toluene (160 ml) and isopropyl alcohol (40 ml) and the suspension was vigorously stirred while refluxing. Thereafter, the precipitates were collected by filtration and washed with a mixed solvent of toluene and isopropyl alcohol (4:1 by volume ratio) followed by drying to obtain 12.2 g of the intermediate 2 (yield 84% as the disodium salt).

(3) Synthesis of Compound 1

A deionized water (70 ml) solution of the intermediate 2 (5 g, 7.0 mmol) was ice-cooled, concentrated hydrochloric acid (1.75 ml) was added to the solution followed by stirring vigorously, a deionized water (5 ml) solution of sodium nitrite (588 mg, 8.4 mmol) was further added thereto, and while ice-cooling, the mixture was stirred for 60 minutes to prepare a diazonium salt. On the other hand, the intermediate 1 (4.5 g, 8.4 mmol) was dissolved in deionized water (30 ml), and after further adding thereto pyridine (15 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., isopropyl alcohol (100 ml) and a saturated aqueous solution of sodium acetate (40 ml) were added. After cooling the mixture to 40° C., the precipitates formed were collected by filtration, and washed with a 10% aqueous solution of sodium acetate, a mixed solvent of isopropyl alcohol and water (4:1 by volume ratio) and then isopropyl alcohol, followed by drying.

The crude product of the compound 1 thus obtained was dissolved in 80 ml of water at 80° C., and then while stirring, isopropyl alcohol (320 ml) was added dropwise to the solution at 70° C. The mixture was cooled to 50° C., the precipitates formed were collected by filtration, washed with a mixed solvent of isopropyl alcohol and water (4:1 by volume ratio) and then isopropyl alcohol, and dried to obtain 4.95 g (3.92 mmol, 56%) of the compound 1.

(Synthesis of Compound 2)

The synthesis method of the compound 2 is explained in detail. First, the synthesis course of the compound 2 is shown below.

deposited were collected by filtration, and washed with a 10% aqueous solution of sodium chloride and then acetonitrile followed by drying to obtain 82 g of the desired intermediate 3 (yield of 77% as the disodium salt).

(2) Synthesis of Compound 2

A deionized water (120 ml) solution of the intermediate 2 (10 g, 14 mmol) was ice-cooled, concentrated hydrochloric acid (3.5 ml) was added to the solution followed by stirring vigorously, a deionized water (10 ml) solution of sodium nitrite (1.18 g, 17 mmol) was further added thereto, and while ice-cooling, the mixture was stirred for 60 minutes to prepare a diazonium salt. On the other hand, the intermediate 3 (9 g, 16.8 mmol) was dissolved in deionized water (60 ml), and after further adding thereto pyridine (30 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., and isopropyl alcohol (200 ml) and a saturated aqueous solution (60 ml) of sodium acetate were added. After cooling to 50°

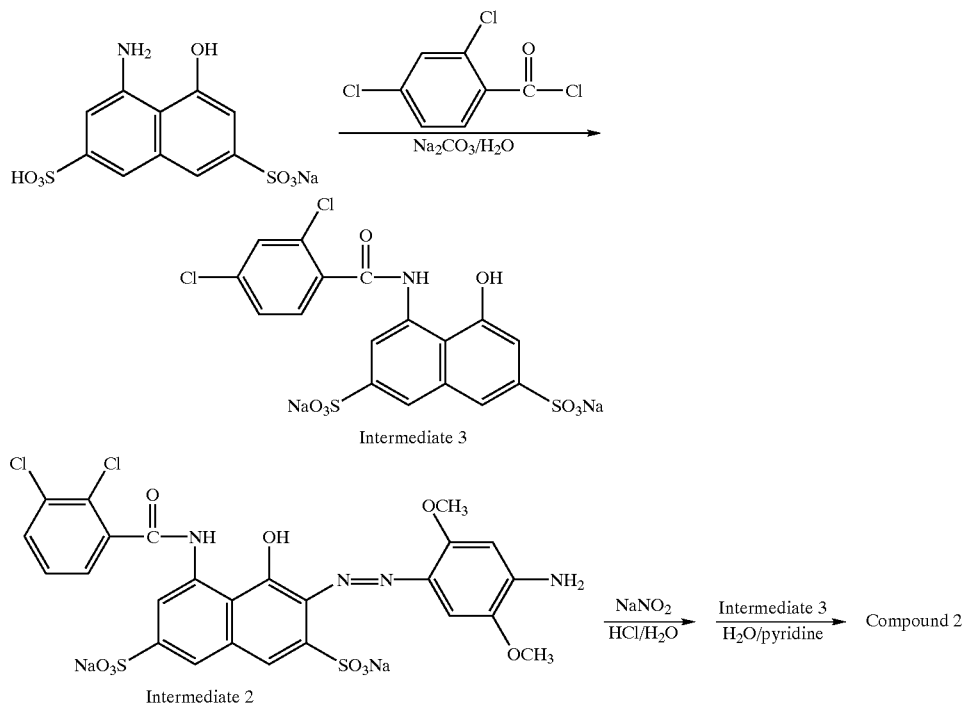

(1) Synthesis of Intermediate 3

The intermediate 3 was synthesized using an improved method of the Schotten-Baumann method.

In a deionized water (400 ml) were dissolved 8-amino-3,6-disulfo-1-naphthol (H acid, 68.2 g, 200 mmol as the monosodium salt), sodium hydroxide (8.6 g, 140 mmol), and sodium carbonate (12.7 g, 120 mmol), and while blowing in a nitrogen gas, 2,4-dichlorobenzoyl chloride (46.1 g, 220 mmol) was added dropwise to the solution at a temperature of from 38 to 44° C. over a period of about one hour. After vigorously stirring the reaction mixture at the temperature for one hour, the temperature was raised to 80° C., and the mixture was further stirred vigorously for one hour. After adding thereto 80 ml of a 10% aqueous solution of sodium chloride and cooling the mixture to 35° C., the precipitates C., the precipitates formed were collected by filtration, washed with a 10% aqueous solution of sodium acetate, a mixed solvent of isopropyl alcohol and water (4:1 by volume ratio) and then isopropyl alcohol, and dried.

The crude product of the compound 2 thus obtained was dissolved in 150 ml of water at 80° C., and then while stirring, isopropyl alcohol (600 ml) was added dropwise to the solution at 70° C. The mixture was cooled to 50° C., the precipitates formed were collected by filtration, washed with a mixed solvent of isopropyl alcohol and water (4:1 by volume ratio) and then isopropyl alcohol, and dried to obtain 9.5 g (7.5 mmol, 54%) of the compound 2.

(Synthesis of Compound 4)

(1) Synthesis of Intermediate 4

By following the same procedure as the synthesis of the intermediate 1 of the compound 1 using 3,4-dichlorobenzoyl chloride in place of 2,3-dichlorobenzoyl chloride, the intermediate 4 represented below was quantitatively obtained.

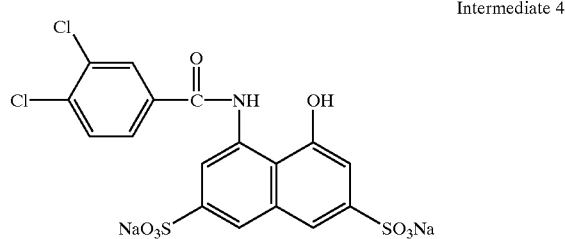

Intermediate 4

(2) Synthesis of Compound 4

A deionized water (40 ml) solution of the intermediate 2 (3 g, 4.2 mmol) was ice-cooled, concentrated hydrochloric acid (1.05 ml) was added to the solution followed by stirring vigorously, a deionized water (5 ml) solution of sodium nitrite (350 mg, 5.1 mmol) was further added thereto, and while ice-cooling, the mixture was stirred for 60 minutes to prepare a diazonium salt. On the other hand, the intermediate 4 (2.7 g, 5 mmol) was dissolved in deionized water (20 ml), and after further adding thereto pyridine (15 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., and isopropyl alcohol (100 ml) and sodium acetate (6 g) were added. After cooling the mixture to 40° C., the precipitates formed were collected by filtration, and washed with a 10% aqueous solution of sodium acetate, a mixed solvent of isopropyl alcohol and water (4:1 by volume ratio) and then isopropyl alcohol, followed by drying.

The crude product of the compound 4 thus obtained was dissolved in 130 ml of water at 80° C., and then while stirring, isopropyl alcohol (300 ml) was added dropwise to the solution at 70° C. The mixture was cooled to 50° C., the precipitates formed were collected by filtration, washed with a mixed solvent of isopropyl alcohol and water (4:1 by volume ratio) and then isopropyl alcohol, and dried to obtain 2.7 g (2.14 mmol, yield 51%) of the compound 4.

(Synthesis of Compound 5)

(1) Synthesis of Intermediate 5

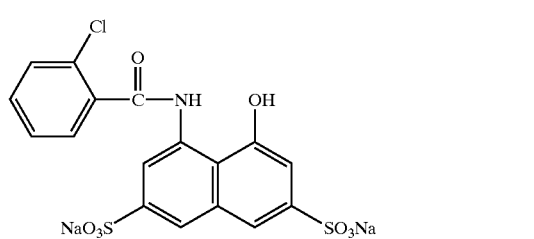

Intermediate 5

The intermediate 5 was synthesized using an improved method of the Schotten-Baumann method.

In a deionized water (300 ml) were dissolved 8-amino-3,6-disulfo-1-naphthol (H acid, 51.2 g, 150 mmol as the monosodium salt), sodium hydroxide (7.5 g, 188 mmol), and sodium carbonate (10.6 g, 120 mmol), and while blowing in a nitrogen gas, o-chlorobenzoyl chloride (29 g, 165 mmol) was added dropwise to the solution at a temperature of from 35 to 40° C. over a period of about one hour. After vigorously stirring the reaction mixture at the temperature for one hour, the temperature was raised to 80° C., and the mixture was further stirred vigorously for one hour. Then, 3 g of sodium carbonate was added and the mixture was stirred for 30 minutes at 80° C. After adding 300 ml of a 10% aqueous solution of sodium chloride and further adding concentrated hydrochloric acid until the pH of the reaction liquid became 4, the reaction mixture was cooled to 35° C., and the precipitates formed were collected by filtration, washed with a 10% aqueous solution of sodium chloride and then acetonitrile, and dried to obtained 68.3 g (yield of 91% as the disodium salt) of the desired intermediate 5.

(2) Synthesis of Compound 5

By following the same procedure as the synthesis of the compound 1 using the intermediate 5 in place of the intermediate 1 in the final step of the synthesis of the compound 1, the compound 5 was obtained with the yield of 53%.

(Synthesis of Compound 3)

By following the same procedure as the synthesis of the compound 1 using the commercially available N-benzoyl H acid in place of the intermediate 1 in the final step of the synthesis of the compound 1, the compound 3 was obtained with the yield of 58%.

(Synthesis of Compound 6)

(1) Synthesis of Intermediate 6

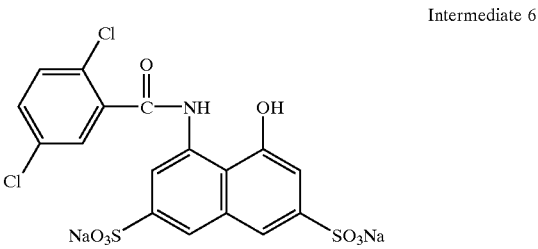

Intermediate 6

The intermediate 6 was synthesized using an improved method of the Schotten-Baumann method.

In a deionized water (200 ml) were dissolved 8-amino-3,6-disulfo-1-naphthol (H acid, 31.2 g, 91 mmol as the monosodium salt), sodium hydroxide (4.5 g, 110 mmol), and sodium carbonate (7 g, 66 mol), and while blowing in a nitrogen gas, a THF solution (40 ml) of 2,5-dichlorobenzoyl chloride (after preparing from 22 g of 2,5-dichlorobenzoic acid and 100 ml of thionyl chloride, the excessive thionyl chloride was distilled off under a reduced pressure) was added dropwise to the solution at a temperature of from 35 to 40° C. over a period of about one hour. After vigorously stirring the reaction mixture at the temperature for one hour, the temperature was raised to 80° C., and the mixture was further stirred vigorously for one hour. Then, 200 ml of a saturated aqueous solution of sodium chloride was added and after adding concentrated hydrochloric acid until the pH of the reaction liquid became 5, the mixture was cooled to 20° C., and the precipitates formed were collected by filtration, washed with a 10% aqueous solution of sodium chloride and then acetonitrile, and dried to obtain 48 g (yield of 98% as the disodium salt) of the desired intermediate 6.

(2) Synthesis of Compound 6

By following the same procedure as the synthesis of the compound 1 using the intermediate 6 in place of the intermediate 1 in the final step of the synthesis of the compound 1, the compound 6 was obtained with the yield of 63%.

(Synthesis of Compound 7)
The synthesis course of the compound 7 is shown below.

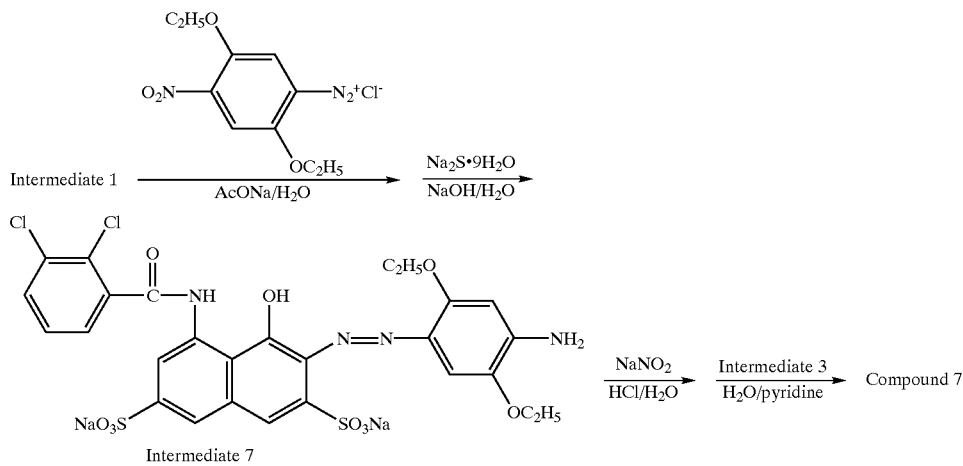

(1) Synthesis of Intermediate 7

In a mixed solvent of deionized water (20 ml) and concentrated hydrochloric acid (5.1 ml) was dissolved 2,5-diethoxy-4-nitroaniline (4.52 g, 20 mmol), and while ice-cooling, a deionized water (10 ml) solution of sodium nitrite (1.56 g, 22 nmol) was added. While ice-cooling, the reaction mixture was stirred for 60 minutes. The aqueous solution of the diazonium salt thus prepared was added to a deionized water solution (200 ml) of the intermediate 1 (12 g, 22.2 mmol as the disodium salt) and sodium acetate (5.5 g) at 10° C. After stirring the reaction mixture for one hour at 20° C., the temperature was raised to 45° C., and the mixture was further stirred for one hour.

To the reaction mixture were added a 20% aqueous solution (9 ml) of sodium hydroxide and then sodium sulfide nonahydrate (19.2 g, 80 mmol) was added, and the mixture was stirred for one hour at 45° C. After stirring, when the reaction mixture was neutralized by the addition of acetic acid (6 ml), precipitates were deposited. Furthermore, after adding a saturated aqueous solution of sodium acetate (40 ml), the precipitates deposited were collected by filtration, and washed with a 10% aqueous solution of sodium acetate and then isopropyl alcohol.

The crude product of the intermediate 7 thus obtained was suspended in a mixed solvent of toluene (160 ml) and isopropyl alcohol (40 ml) and the suspension was vigorously stirred while refluxing. Thereafter, the precipitates were collected by filtration and washed with a mixed solvent of toluene and isopropyl alcohol (4:1 by volume ratio) followed by drying to obtain 2.8 of the intermediate 7 (yield of 19% as the disodium salt).

(2) Synthesis of Compound 7

A deionized water (50 ml) solution of the intermediate 7 (2.23 g, 3.0 mmol) was ice-cooled, concentrated hydrochloric acid (1.1 ml) was added to the solution followed by stirring vigorously, a deionized water (3 ml) solution of sodium nitrite (230 mg, 3.3 mmol) was further added thereto, and while ice-cooling, the mixture was stirred for 30 minutes to prepare a diazonium salt. On the other hand, the intermediate 3 (1.93 g, 3.6 mmol) was dissolved in deionized water (40 ml), and after further adding thereto pyridine (18 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., and isopropyl alcohol (100 ml) and sodium acetate (25 g) were added. After cooling the mixture to room temperature, the precipitates formed were collected by filtration, and washed with a 10% aqueous solution of sodium acetate, a mixed solvent of isopropyl alcohol and water (4:1 by volume ratio) and then isopropyl alcohol, followed by drying.

The crude product of the compound 7 thus obtained was hot-washed with 400 ml of a mixed solvent (4:1 by volume ratio) of ethanol and water, and after filtering, the product collected was washed with ethanol and dried to obtained 2.46 g (1.91 mmol, 64%) of the compound 7.

EXAMPLE 8

Synthesis of Compound 8

The synthesis course of compound 8 is shown below.

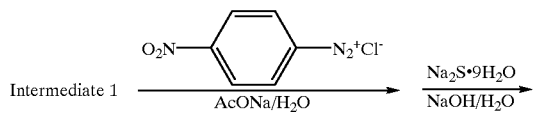

-continued

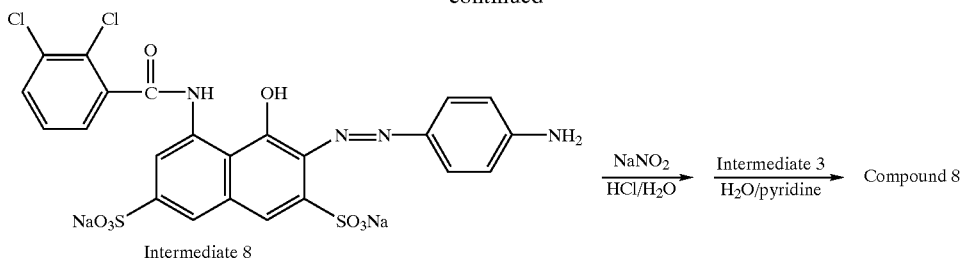

Intermediate 8

(1) Synthesis of Intermediate 8

In a mixed solvent of deionized water (30 ml) and concentrated hydrochloric acid (7.5 ml) was dissolved p-nitroaniline (4.14 g, 30 mmol) and while ice-cooling, a deionized water (15 ml) solution of sodium nitrite (2.31 g, 33 mmol) was added to the solution. Then, while ice-cooling, the reaction mixture was stirred for 60 minutes. The aqueous solution of the diazonium salt thus prepared was added to a deionized water solution (270 ml) of the intermediate 1 (17 7 g, 33 mmol as the disodium salt) and sodium acetate (9.3 g) at 10° C. After stirring the reaction mixture for one hour at 20° C., the temperature was raised to 45° C., and the reaction mixture was further stirred for one hour.

To the reaction mixture were added a 20% aqueous solution (15 ml) of sodium hydroxide and then sodium sulfide nonahydrate (28.8 g, 120 mmol), and the mixture was stirred for one hour at 45° C. Thereafter, when the mixture was neutralized by the addition of acetic acid (10 ml), precipitates were deposited. After further adding thereto a saturated aqueous sodium acetate solution (30 ml), the precipitates formed were collected by filtration and then washed with isopropyl alcohol.

The crude product of the intermediate 8 thus obtained was suspended in a mixed solution of toluene (200 ml) and isopropyl alcohol (50 ml) followed by vigorously stirred while refluxing. Thereafter, the precipitates formed were collected by filtration, washed with a mixed solvent (4:1 by volume ratio) of toluene and isopropyl alcohol, and dried to obtain 7.3 g (yield of 37% as the disodium salt) of the intermediate 8.

(2) Synthesis of Compound 8

A deionized water (70 ml) solution of the intermediate 8 (2.62 g, 4.0 mmol) was ice-cooled, concentrated hydrochloric acid (1.35 ml) was added to the solution followed by stirring vigorously, a deionized water (10 ml) solution of sodium nitrite (310 mg, 4.4 mmol) was further added thereto, and while ice-cooling, the mixture was stirred for 30 minutes to prepare a diazonium salt. On the other hand, the intermediate 3 (2.57 g, 4.8 mmol) was dissolved in deionized water (40 ml), and after further adding thereto pyridine (25 ml) and water (12 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., isopropyl alcohol (100 ml) and sodium acetate (15 g) were added. After cooling the mixture to 40° C., the precipitates formed were collected by filtration, and washed with a mixed solvent of ethanol and water (4:1 by volume ratio), ethanol and then isopropyl alcohol, followed by drying to provide 2.46 g (1.91 mmol, 64%) of the compound 8.

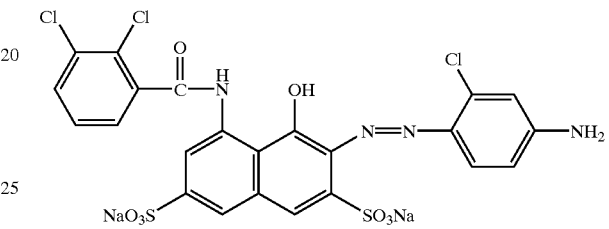

(Synthesis of Compound 9)
(1) Synthesis of Intermediate 9

By following the same procedure as the synthesis of the intermediate 2 in the synthesis method of the compound 1 using 2-chloro-4-nitroaniline in place of 2,5-dimethoxy-4-nitroaniline, an intermediate 9 was synthesized.

(2) Synthesis of Compound 9

By following the same procedure as the synthesis of the compound 8 using the intermediate 9 in place of the intermediate 8, a compound 9 was obtained with a yield of 23%.

(Synthesis of Compound 10)

A deionized water (100 ml) solution of 2,5-dimethyl-1,4-phenylenediamine (1.36 g, 10 mmol) was ice-cooled, concentrated hydrochloric acid (5 ml) was added to the solution followed by stirring vigorously, a deionized water (10 ml) solution of sodium nitrite (1.54 g, 22 mmol) was further added thereto, and while ice-cooling, the mixture was stirred for 60 minutes to prepare a diazonium salt. On the other hand, the intermediate 1 (14 g, 26 mmol) was dissolved in deionized water (120 ml), a 1 normal aqueous solution of sodium hydroxide was added until the pH of the solution became about 7, and after further adding thereto pyridine (30 ml) and water (15 ml), the suspension of the diazonium salt prepared by the above-described operation was added to the mixture at a temperature of from 10° C. to 15° C. After stirring the reaction mixture for 60 minutes at room temperature, the temperature was raised to 50° C., and the mixture was further stirred for 30 minutes. Then, the temperature was raised to 70° C., and isopropyl alcohol (200 ml) and sodium acetate (20 g) were added. After cooling the mixture to 35° C., the precipitates formed were collected by filtration, and washed with a mixed solvent of ethanol and water (4:1 by volume ratio) and then ethanol. The crude product of the compound 10 thus obtained was dissolved in 50 ml of water at 80° C. and then, ethanol (200 ml) was added dropwise to the solution at 80° C. with stirring. The reaction mixture was cooled to 35° C., precipitates formed were collected by filtration, washed with ethanol, and dried to obtain 1.45 g (2.3 nmol, 23%) of the compound 10.

(Preparation of Compound 12 by Ion-exchange Method)

An acid-type Amberlite 120B (wet volume 10 ml) was packed in a column and an aqueous solution containing a largely excessive L-tyrosineamide (3.8 g) was circulated through the column to adsorb L-tyrosineamide in saturation. Then, 100 mg of the compound 2 was passed through the ion-exchange column 5 times (10 minutes/one time) and the effluent was lyophilized to obtain 120 mg of a compound 12. It was confirmed by NMR and the elementary analysis that the ion exchange was completed.

(Preparation of Compound 11 by Ion-exchange Method)

Using an ion-exchange column of Amberlite 120B adsorbed with potassium ions in saturation, by carrying out the ion exchange of the compound 2 by the same method as in the Preparation of the compound 12, a compound 11 was obtained.

Each of the compounds of the invention synthesized as described above was dissolved in dimethyl sulfoxide such that the concentration thereof became 1 mg/ml, the solution was diluted with pure water or PBS (phosphate buffer saline) to 100 times to prepare a measurement solution and the maximum absorption wavelength and the absorbance were measured.

The results were as shown in the following table. The unit of λ max is nm. Also, each bisazo compound synthesized as described above absorbs moisture in air and usually contains at least 5% by weight water, but the value of the absorbance is not corrected by the water content.

TABLE 2

| Compound No. | Pure Water Solvent | | PBS Solvent | |
|---|---|---|---|---|
| | λmax | Absorbance | λmax | Absorbance |
| 1 | 668 | 0.388 | 668 | 0.375 |
| 2 | 669 | 0.469 | 668 | 0.461 |
| 3 | 669 | 0.510 | 623 | 0.493 |
| 4 | 669 | 0.505 | 613 | 0.347 |
| 5 | 668 | 0.448 | 667 | 0.436 |
| 6 | 668 | 0.369 | 668 | 0.356 |
| 7 | 675 | 0.484 | 671 | 0.497 |
| 8 | 653 | 0.661 | 604 | 0.532 |
| 9 | 602 | 0.356 | 603 | 0.294 |
| 10 | 627 | 0.555 | 616 | 0.469 |
| 11 | 670 | 0.392 | 669 | 0.381 |
| 12 | 670 | 0.357 | 670 | 0.348 |

Also, by carrying out the procedures according to the methods described for producing the compounds 1 to 12, the compounds shown below can be produced.

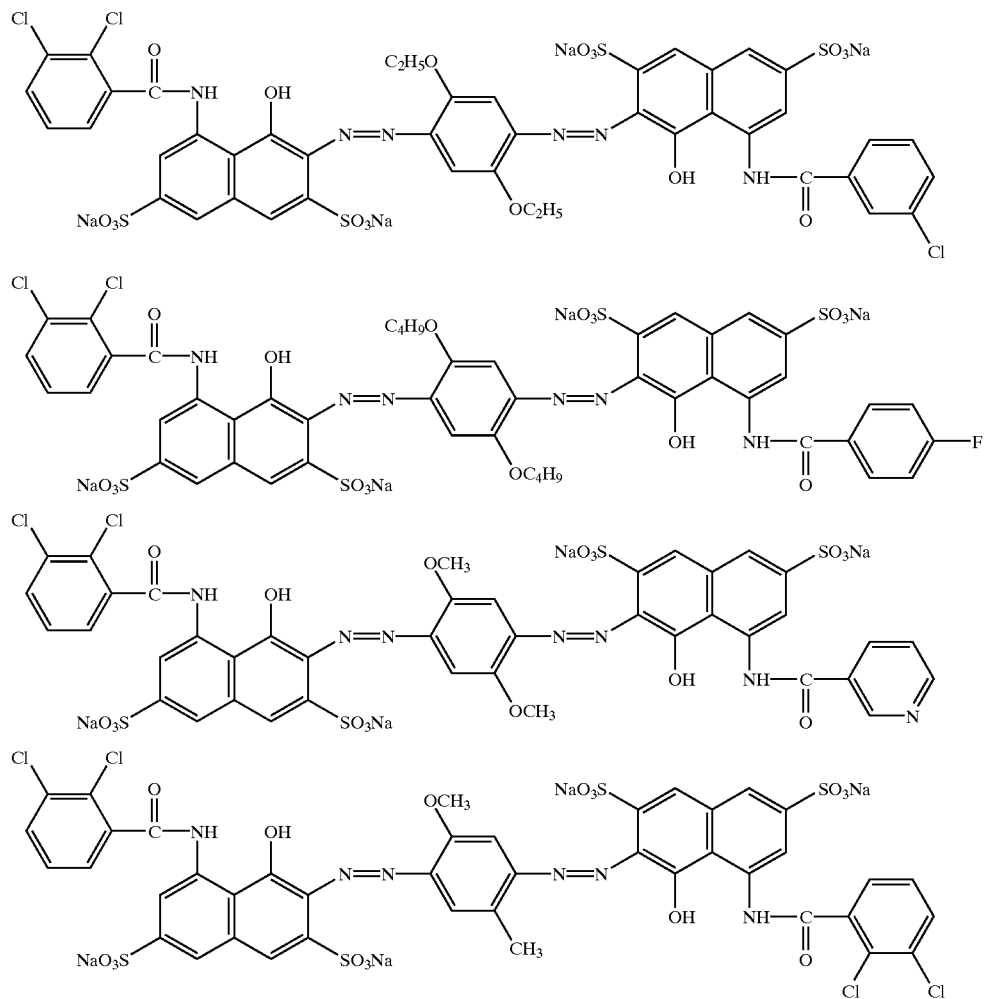

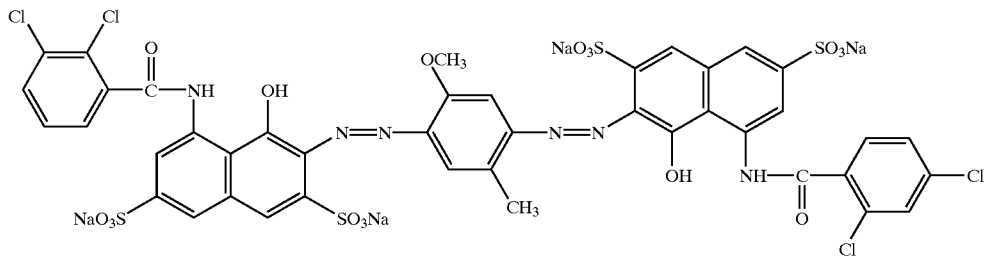
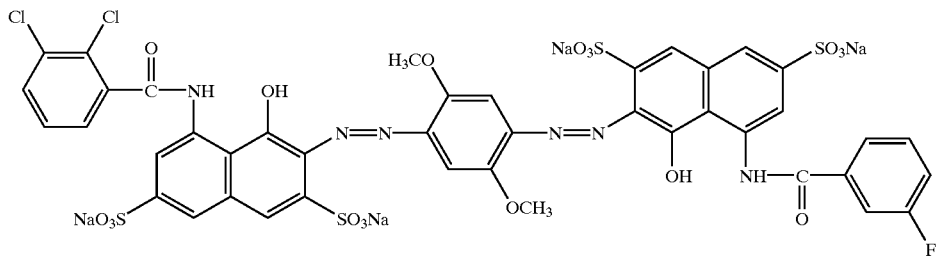
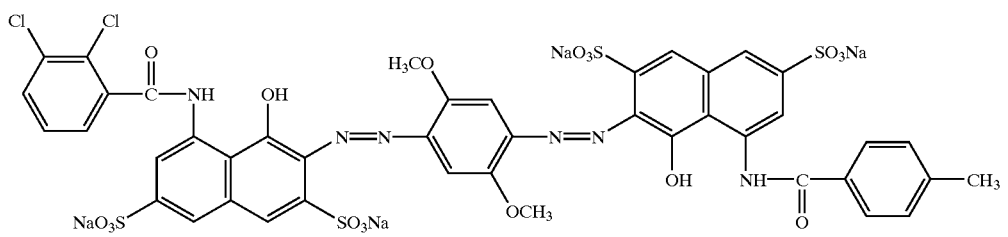
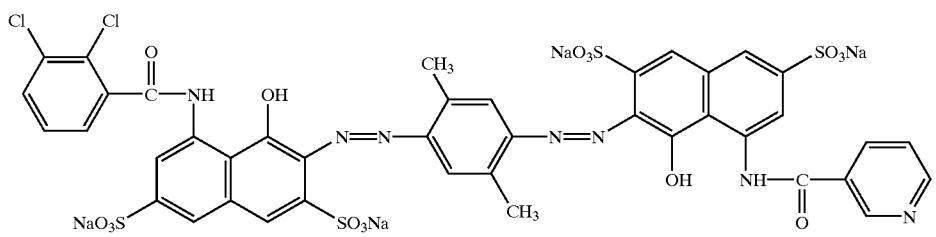
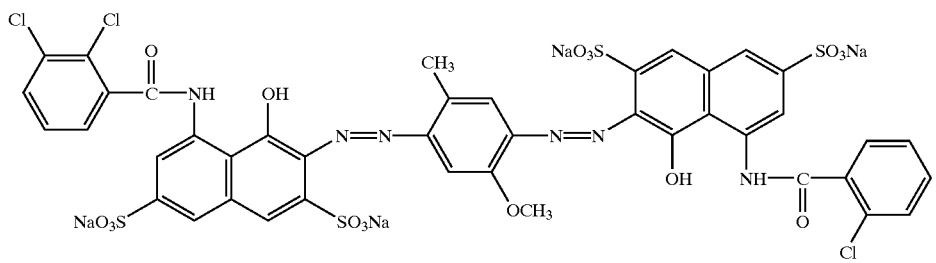
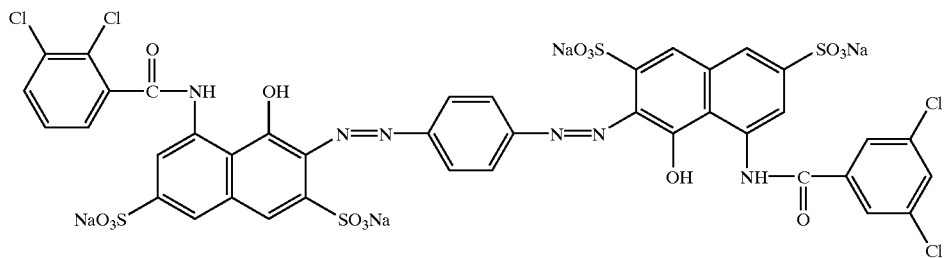

-continued

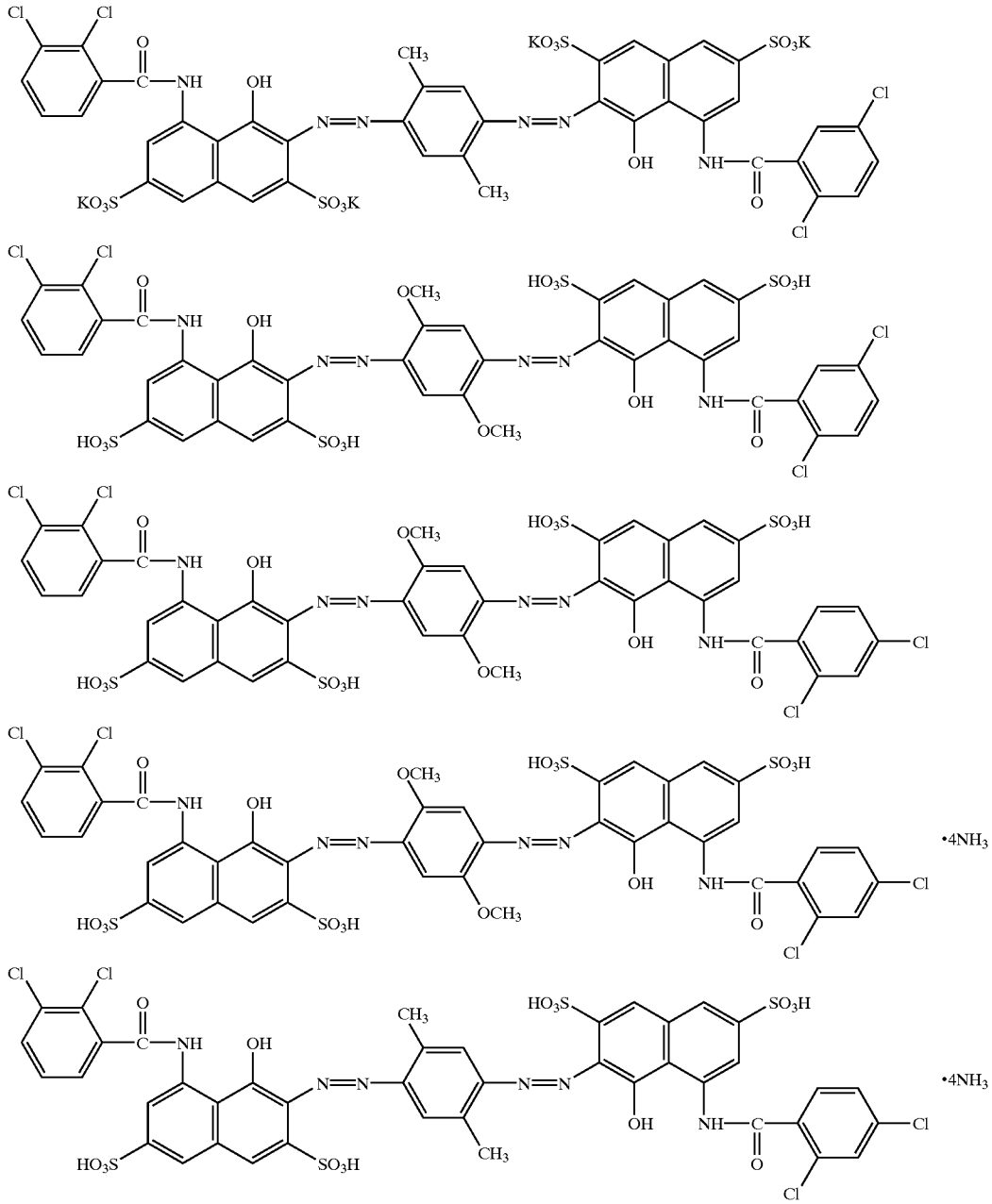

It is known that in the azo dye synthesized from an enol coupling component such as phenol, naphthol, or pyrazolone, there exist azo(enol) type and hydrazo(keto) type tautomerisms ("PHOTOGRAPHIC SCIENCE AND ENGINEERING", Vol. 20, 155 (1976)). In the specification, the compounds were described above as the azo(enol)type but in the invention, the compound having the hydrazo(keto) tautomeric structure can be also used.

(Aggregates of Dichromatic Dye)

When the dichromatic dye described above is dissolved and dispersed in a solvent, which can dissolve the dye, aggregates forming a lyotropic liquid crystal phase are formed.

The solvents suitable for forming the aggregates are water, alcohols, etc., and water is preferred.

Now, the aggregates forming the lyotropic liquid crystal phase form string-form micelles by the dye molecule, the length thereof is at least 50 nm, and longer length is preferred.

The concentration of the dichromatic dye is preferably from 1 to 50%, and more preferably from 7 to 30%, based on the weight of the solution or dispersion. When the concentration is too low, the aggregates are hard to form, while when the concentration is too high, the phenomena of inferior dissolution and dispersion, and the increase of the viscosity, etc., occur, which cause inconveniences.

For the dissolution and dispersion of a dichromatic dye in the solvent, a dispersion method known in the field of the art can be used. Also, an emulsion-dispersion method in the photographic field can be used. Also, the solid dispersion method described in JP-A-63-271339 can be used.

The solution containing the aggregates of the dichromatic dye becomes a coating liquid for forming a dichromatic polarizing element by dispersing, if necessary, a binder polymer and other components in the solution.

In the dichromatic polarizing element of the invention, the aggregates of the dichromatic dye formed as described above are oriented to a definite direction such that a light passing therethrough is polarized.

After orienting the aggregates of the dichromatic dye by applying a force capable of orienting the aggregates (hereinafter, is referred to as "orientation force") to the aggregates, by removing the orientation force, the orientation of the aggregates is fixed.

As the orientation force, generally, a stress may be added, and as the stress, there are a normal stress and a shearing stress, and in these stresses, the shearing stress is preferred. When coating the above-described coating liquid on a material to be coated, by using preferably bar coating, curtain coating, extrusion coating, roll coating, and slide coating in the coating methods described later, the shearing stress can be added to the aggregates in the coating liquid.

The coating liquid of the invention can be coated on a paper, a synthetic high molecular film, a metal, a glass, etc., but for forming a dichromatic polarizing element, a transparent material to be coated is preferred, and a transparent support, a glass, etc., are preferred.

(Transparent Support)

As the transparent support used in the invention, any materials can be used if the materials are transparent. A material having a light transmittance of at least 80% is preferred. As such a material, commercially available products, such as Zeonex (manufactured by Nippon Zeon Co., Ltd.), Zeonor (manufactured by Nippon Zeon Co., Ltd.), ARTON (manufactured by JSR Corp.), Fujitac (manufactured by Fuji Photo Film Co., Ltd.), etc., can be used. Furthermore, the materials such as polycarbonate, polyarylate, polysulfone, polyether sulfone, etc., may be used.

For improving the coated surface form of the dichromatic polarizing element and the adhesion of the coated layer, it is preferred to apply a hydrophilic surface treatment to the support. Particularly, when triacetyl cellulose is used as the support, a saponification treatment is effective. Also, for the same purposes, a subbing layer may be formed on a transparent support. As the subbing layer, gelatin, polyvinyl alcohol, etc., are generally used.

When a transparent support is used for a liquid crystal cell side, it is preferred to control the birefringence. When the main refractive indexes in the plate are nx and ny, and main refractive index in the thickness direction is nz, and the thickness of the film is d, it is preferred that the relation of the main refractive indexes of the three axes satisfies nz<ny <nx (biaxial) and the retardation shown by {(nx+ny)/2−nz}×d is from 20 to 400 nm, and more preferably from 30 to 200 nm.

The front retardation shown by |nx−ny|×d is preferably 100 nm or lower, and more preferably 60 nm or lower. When the transparent support is disposed at the opposite side of the film to the side of the liquid crystal cell, there is no restriction on the birefringence.

(Binder Polymer)

For the dichromatic polarizing element of this invention, a binder polymer may be used. There is no particular restriction on the binder polymer if the polymer can form a crosslinked structure. A polymer, which can be crosslinked by itself, may be used. Also, any polymers, which can be crosslinked with a crosslinking agent, can be used. The crosslinked structure can be formed by reacting binder polymers each other, each having a functional group or having introduced therein a functional group, by light, heat, a pH change, etc.; or by using a crosslinking agent, which is a compound having a high reactivity, introducing the linkage group originated in the crosslinking agent in the binder polymers and crosslinking the binder polymers each other.

Such crosslinking is usually practiced by incorporating the above-described binder polymer or a mixture of a binder polymer and a crosslinking agent in the coating liquid for forming the dichromatic polarizing element of the invention, and after coating the coating liquid on a transparent support, by carrying out heating, the irradiation of ultraviolet rays, etc. In this case, because the durability may be insured in the final product, the crosslinking treatment may be carried out in any stage of obtaining the final polarizer.

As the binder polymer used for the dichromatic polarizing element of the invention, as already stated, a polymer, which can be crosslinked by itself, or a polymer, which is crosslinked with a crosslinking agent, can be used. As a matter of course, a polymer, which can be crosslinked by itself and also contains a crosslinking agent, can be used.

Examples of the above-described polymer include polymers such as polymethyl methacrylate, an acrylic acid/methacrylic acid copolymer, a styrene/maleinimide copolymer, polyvinyl alcohol, modified polyvinyl alcohol, poly(N-methylol acrylamide), a styrene/vinyltoluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, carboxymethyl cellulose, polyethylene, polypropylene, polycarbonate, etc.; and compounds such as a silane coupling agent, etc. Also, there are water-soluble polymers such as poly(N-methylolacrylamide), carboxymethyl cellulose, gelatin, polyvinyl alcohol, modified polyvinyl alcohol, etc.

(Crosslinking Agent)

As already stated, for forming a crosslinked structure, the binder polymer may contain a crosslinking agent. There is no particular restriction on the crosslinking agent used and the addition agent thereof tends to be increased to improve the wet and heat resistance. However, because when the crosslinking agent is added in an amount of 50% by weight or more to the binder polymer, orienting property is lowered, the addition amount is preferably from 0.1 to 20% by weight, and more preferably from 0.5 to 15% by weight.

Even after finishing the crosslinking reaction, the dichromatic polarizing element of the invention contains an unreacted crosslinking agent to some extent and the amount of the crosslinking agent contained in the binder polymer layer is preferably not more than 1.0% by weight, and particularly preferably not more than 0.5% by weight. When the crosslinking agent is contained in the binder polymer layer in an amount exceeding 1.0% by weight, a sufficient durability is not obtained. That is, when such a dichromatic polarizing element is used for a liquid crystal display device, and the display device is used for a long period of time, or is allowed to stand for a long period of time under a high-temperature high-humidity atmosphere, the polarization degree is sometimes lowered.

(Color Controlling Agent)

For controlling the hue of the dichromatic polarizing element of the invention, the polarizing element may contain a dichromatic molecule generally known in the field of the art. Examples of the dichromatic molecule include dye-base compounds such as azo-base dyes, stilbene-base dyes, pyrazolone-base dyes, triphenylmethane-base dyes, quinoline-base dyes, oxazine-base dyes, thiazine-base dyes, and anthraquinone-base dyes. In these dyes, the water-soluble dyes are preferred but, as a matter of course, other dyes can be used. Also, it is preferred the dichromatic molecule has introduced therein a hydrophilic substituent such as a sulfonic acid group, an amino group, a hydroxy group, etc.

Specific examples of the dichromatic molecule include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. Furthermore, there are dyes described in JP-A-1-161202, JP-A-1-172906, JP-A-1-172907, JP-A-1-183602, JP-A-1-248105, JP-A-1-265205, and JP-A-7-261024.

These dichromatic molecules are used as the free acids or the salts thereof, such as the alkali metal salts, the ammonium salts, the amines, etc. By compounding two or more kinds of these dichromatic molecules, the dichromatic polarizing elements having various hues can be produced. The dichromatic polarizing element compounded with compounds (dyes) showing a black color in the case of crossing the polarization axes at right angle or compounded with various kinds of the dichromatic molecules such that they show a black color is preferred because of being excellent in both the single-plate permeability and the polarization ratio.

(Coating Method)

As the coating method of the coating liquid for forming the dichromatic polarizing element, there are a curtain coating method, an extrusion coating method, a roll coating method, a dip coating method, a spin coating method, a printing coating method, a spray coating method, a slide coating method, etc. In the invention, it is preferred to coat while applying a shearing force and also a continuous coating method is preferred. Specifically, a die coating method, a blade coating method, and a bar coating method are preferred.

In the case of coating the coating liquid for forming the dichromatic polarizing element by, for example, a bar coating method, when the angle of the bar is disposed at a desired angle to the lengthwise direction of a continuously conveying support, and the coating liquid is coated while rotating the bar, a shearing force is applied to the aggregates of the dichromatic dye and the long dichromatic polarizing element formed has an absorption axis having a desired angle to the lengthwise direction of the support. Accordingly, from the long dichromatic polarizing element, dichromatic polarizing element chips each having the absorption axis at the same direction can be obtained with a good yield.

(Protective Layer)

On the light polarizing element of the invention, a protective layer may be formed. For the protective layer, any polymers having a high transparency can be used as the case of the above-described transparent support. In the case of such a film as a protective layer, it is preferred to attach the film with an adhesive or a pressure-sensitive adhesive.

Also, a polymerizing monomer is coated on the binder polymer layer and the monomer may be polymerized. This method is preferred because the thin protective layer can be formed as compared with the attaching method.

As the polymerizing monomer, a compound having a vinyl group, a vinyloxy group, an acryloyl group, or a methacryloyl group is preferably used.

(Application of Dichromatic Polarizing Element)

By combining the light polarizing element of the invention with a coating-type optical member (an optical compensation film, a luminance up film), the absorption axis of a polarizer and the slow axis of each optical member can be controlled with a good precision. Thereby, the function as a liquid crystal display can be improved. As the specific example of the coating type optical member, there is an optical compensatory sheet using a discotic liquid crystalline molecule, which is, for example, described in JP-A-6-214116, U.S. Pat. Nos. 5,583,679 and 5,646,703, and German Patent 3911620A1. Also, an optical compensatory sheet using a rod-form liquid crystalline molecule is a coating type optical member, which is described in JP-A-7-35924. Moreover, the luminance up film is described in JP-A-11-149015.

The light polarizing element of the invention is advantageously used as a polarizer used for a liquid crystal display device, and particularly for the transmission-type liquid crystal display device.

Then, the transmission-type liquid crystal display mode used is described. A transmission-type liquid display device comprises a liquid crystal cell and two polarizers disposed at both sides thereof. The liquid crystal cell holds a liquid crystal between two electrode substrates.

One optical compensatory sheet is disposed between the liquid crystal cell and one of the polarizers or each of two optical compensatory sheets is disposed between the liquid crystal cell and each of the polarizers.

It is preferred that the liquid crystal cell is an OCB mode, a VA mode, or a TN mode.

In the liquid crystal cell of the VA mode, at not applying an electric voltage, a rod-form liquid crystalline molecule is substantially oriented perpendicularly.

The liquid crystal cell of the VA mode includes, (1) a liquid crystal cell of the VA mode in a narrow sense, wherein a rod-form liquid crystalline molecule is substantially perpendicularly oriented at not applying voltage and the liquid crystalline molecule is substantially horizontally oriented at applying voltage (JP-A-2-176625), (2) a liquid crystal cell (of a MVA mode) prepared by forming a multidomain of a VA mode for enlarging the viewing angle (described in SID 97 Digest of tech. Papers (abstracts), 28 (1997), 845), (3) a liquid crystal cell of the mode (n-ASM mode) of substantially perpendicularly orienting a rod-form liquid crystalline molecule at not applying voltage and torsion multidomain orienting at applying voltage (described in abstracts for Nippon Liquid Crystal Forum, 58 to 59 (1998)), and (4) a liquid crystal cell of a SURVAIVAL mode (reported in LCD International 98).

The liquid crystal cell of the OCB mode is a liquid crystal display device using a liquid crystal cell of a bend orientation mode of orienting rod-form liquid crystalline molecules substantially opposite directions (symmetrically) at the upper portion and the lower portion of the liquid crystal cell, and is disclosed in U.S. Pat. Nos. 4,583,825 and 5,410,422. Because the rod-form liquid crystal molecules are symmetrically oriented at the upper portion and the lower portion of the liquid crystal cell, liquid crystal cell of the bend orientation mode has a self optical compensatory function. Therefore, the liquid crystal mode is called an OCB (Optically Compensatory Bend) liquid crystal mode. The liquid crystal display device of the bend orientation mode has a merit that the response speed is fast.

In the case of the liquid crystal display device of the OCB mode, the optical compensatory sheet may have an optically anisotropic layer containing a discotic compound or a rod-form liquid crystal compound on a cellulose acetate film.

The optically anisotropic layer is formed by orienting a discotic compound (or a rod-form liquid crystal compound) and fixing the orientation state.

The discotic compound generally has a large birefringence index. Also, in the discotic compound, there are various orientation modes. Accordingly, by using the discotic compound, an optical compensatory sheet having optical properties, which cannot be obtained by a conventional stretched birefringence film, can be produced. The optical compensatory sheet using the discotic compound is described in JP-A-6-214116, U.S. Pat. Nos. 5,583,679 and 5,644,703, and West German Patent 3911620A1.

In the liquid crystal cell of the TN mode, at not applying voltage, a rod-form liquid crystalline molecule is substantially horizontally oriented and further twist-oriented to from 60 to 120°.

The liquid crystal cell of the TN mode is most frequently used as a color TFT liquid crystal display device, and is described in many literatures.

The dichromatic polarizing element of the invention can be produced by a simple coating method and has a high degree of polarization, and hence the dichromatic polarizing element can cope with small-sizing, thinning, and light-weightening of a liquid crystal display device.

Also, from the long dichromatic polarizing element produced by the method of the invention, dichromatic polarizing element chips can be obtained with a good yield.

Then, the invention is specifically described by the following examples, but the invention is not limited to these examples.

EXAMPLE 1

<Preparation of Dissolved-dispersed Liquid of Aggregates of Dichromatic Dye>

In 34 ml of water was dissolved and dispersed 6 g of the compound 2 as a dichromatic dye at normal temperature. Thereafter, using a ultrasonic homogenizer, UH-50 manufactured by SMT corporation, the compound was dispersed by ultrasonic wave for 10 minutes to obtain the uniform dissolved dispersion 1 of the aggregates of the dichromatic dye. By the above-described operation, the aggregates were easily formed. In this case, the dissolved dispersion of aggregates was the dispersion formed by dispersing aggregates, which became string-form micelles by stacking of the dichromatic dye, in a solvent (water in the case).

<Preparation of Light Polarizing Element>

A proper amount of the above-described dissolved dispersion 1 of the aggregates of the dichromatic dye was hand-coated by a lot rod of #3 on a triacetyl cellulose support subjected to a saponification treatment to obtain a dichromatic polarizing element 1. By an ordinary hand-coating operation, a sufficient shearing force for forming polarizing element is applied, whereby the aggregates are oriented to the coating direction, and the above-described hand-coated product became a dichromatic polarizing element.

<Evaluation>

A large polarizer Assy was mounted on a spectral absorption measuring apparatus, UV3100PC manufactured by Shimadzu Corporation, and about the dichromatic polarizing element prepared, the degree of polarization at 600 nm to 700 nm and the transmittance at the absorption axis were measured. The results are shown in Table 3.

EXAMPLES 2 TO 5

By following the same procedure as Example 1 using each of the compounds 4, 6, 8, and 10 as a dichromatic dye, dichromatic polarizing elements 2 to 5 were prepared and the same evaluation as in Example 1 was carried out. The results are shown in Table 3.

From the results shown in Table 3, it can be seen that the dichromatic polarizing elements of the invention are excellent in the polarizability.

EXAMPLE 6

The dissolved dispersion 1 of the aggregates of the dichromatic dye described in Example 1 was bar-coated on a long triacetate cellulose support having a thickness of 80 μm and a width of 15 cm subjected to a saponification treatment by a bar coating apparatus shown in FIG. 1. The bar coating was carried out at a support conveying speed of 10 meters/minute, a bar rotation peripheral speed of 500 meters/minute, a support tension of 2 kgf/cm, and the bar inclined angle of 50°. Thus, a long polarizer (long dichromatic polarizing element), wherein the absorption axis was inclined at 45° to the lengthwise direction of the support was obtained. About the long polarizer, the evaluation was carried out as in Example 1. The results are shown in Table 3.

EXAMPLES 7 TO 10

By following the same procedures as Examples 2 to 5 using each of the compounds 4, 6, 8, and 10 as the dichromatic dye, dissolved dispersions of aggregates were prepared and bar coating was carried out by the same method as Example 6. In each case, a long polarizer, wherein the absorption axis was inclined at 45° to the lengthwise direction of the support, was obtained. Each of the long polarizers obtained was evaluated as in Example 1. The results are shown in Table 3.

TABLE 3

| Example | Dichromatic Dye compound No. | Polarizing Element Transmission Axis | Polarization Degree (%) | Transmittance of Transmission Axis (%) |
|---|---|---|---|---|
| 1 | Compound 2 | Hand-coating direction | 99.1 | 52 |
| 2 | Compound 4 | Hand-coating direction | 98.5 | 49 |
| 3 | Compound 6 | Hand-coating direction | 98.8 | 48 |
| 4 | Compound 8 | Hand-coating direction | 95.0 | 52 |
| 5 | Compound 10 | Hand-coating direction | 91.0 | 56 |
| 6 | Compound 2 | 45° from convey direction | 99.0 | 51 |
| 7 | Compound 4 | 45° from convey direction | 98.2 | 49 |
| 8 | Compound 6 | 45° from convey direction | 98.5 | 49 |
| 9 | Compound 8 | 45° from convey direction | 94.0 | 53 |
| 10 | Compound 10 | 45° from convey direction | 91.0 | 57 |

<Work as Chip for Liquid Crystal Display Device>

From each of the long polarizers of the invention, a chip having a size corresponding to 15 inches was cut using a guillotine cutter.

Figure 2:
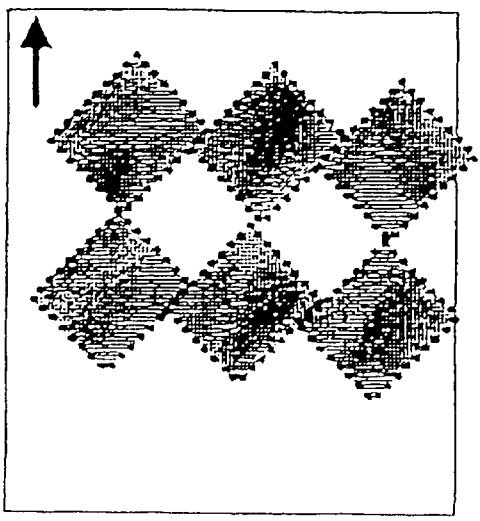
FIG. 2 is schematic plain views showing the states of preparing polarizer chips from long dichromatic polarizing elements.
Figure 2:
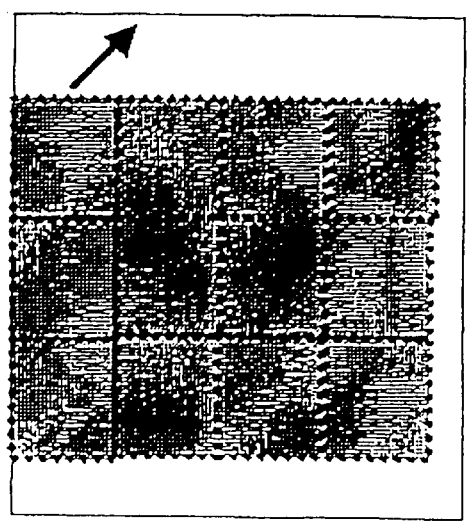

As shown in FIG. 2, because the long polarizer of the invention has the absorption axis in the direction of 45°, in the case of forming chips, the loss could be greatly reduced.

On the other hand, because the conventional polarizer had the absorption axis in the width direction, chips are prepared by cutting to the direction of 450 as shown in FIG. 2, whereby loss is much.

While the invention has been described in detail and with reference to specific embodiments thereof, it will be apparent to one skilled in the art that various changes and modifications can be made therein without departing from the spirit and scope thereof.

What is claimed is:

1. A dichromatic polarizing element comprising a water-soluble organic dichromatic dye selected from the group consisting of a bisazo compound represented by following formula (1), the tautomer thereof, and the salts thereof, wherein the dichromatic dye comprises aggregates oriented to a definite direction such that the dye can polarize a light passing therethrough,

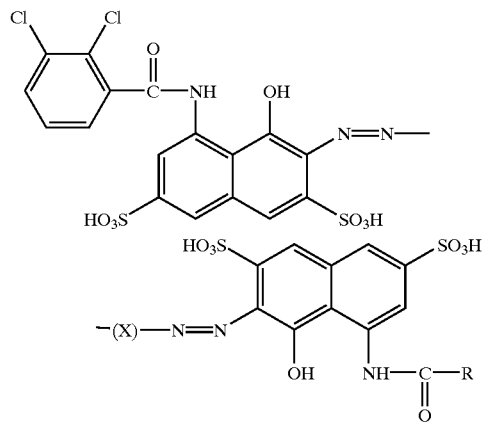

(1)

wherein R represents an unsubstituted or substituted phenyl group or an unsubstituted or substituted heteroaryl group, and X represents an unsubstituted or substituted phenylene group.

2. The dichromatic polarizing element according to claim 1, wherein the bisazo compound represented by the formula (1) is a bisazo compound represented by following formula (2),

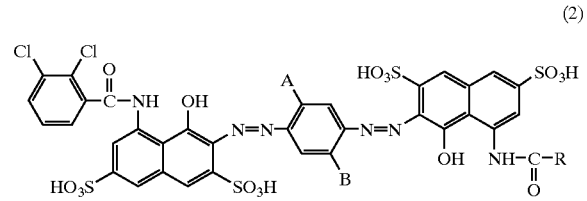

(2)

wherein R represents an unsubstituted or substituted phenyl group or an unsubstituted or substituted heteroaryl group, and A and B, which may be the same or different, each represents a group or an atom selected from the class consisting of a hydrogen atom, an alkyl group having from 1 to 4 carbon atoms, an alkoxy group having from 1 to 4 carbon atoms, and a halogen atom.

3. The dichromatic polarizing element according to claim 2, wherein A and B are a same alkoxy group having from 1 to 4 carbon atoms.

4. The dichromatic polarizing element according to claim 3, wherein A and B are a methoxy group.

5. The dichromatic polarizing element according to claim 4, wherein R is a phenyl group substituted by one or more halogen atom.

6. The dichromatic polarizing element according to claim 5, wherein R is a phenyl group substituted by one or more chlorine atom.

7. The dichromatic polarizing element according to claim 2, wherein the bisazo compound represented by the formula (2) is the bisazo compound selected from the group consisting of the compounds represented by following formula (2-1), (2-2), (2-3), (2-4) or (2-5):

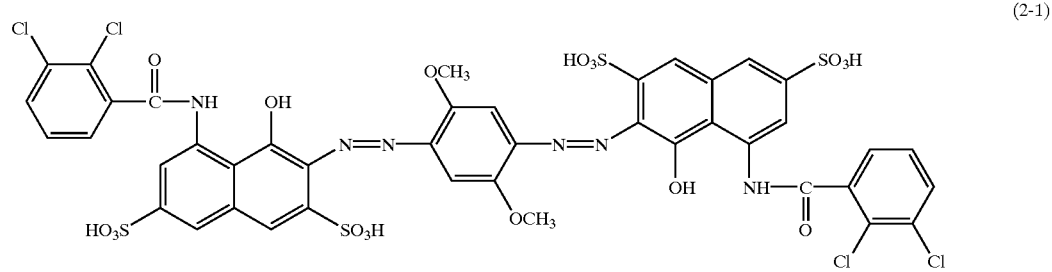

(2-1)

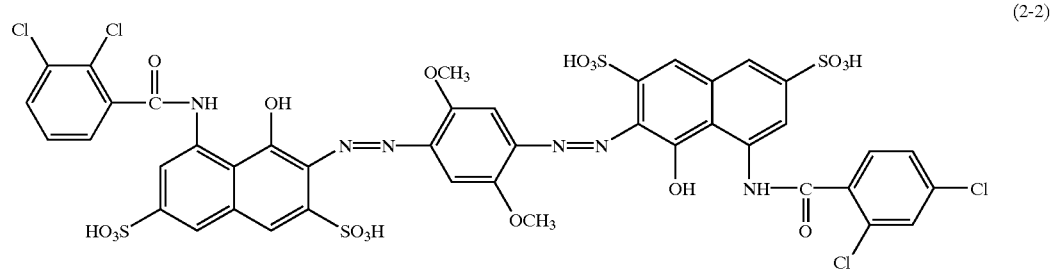

(2-2)

-continued

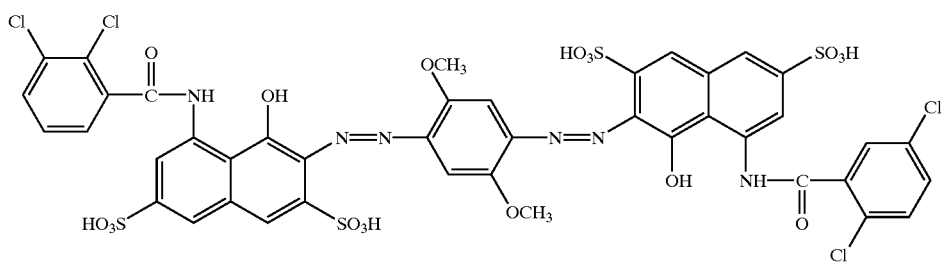
(2-3)

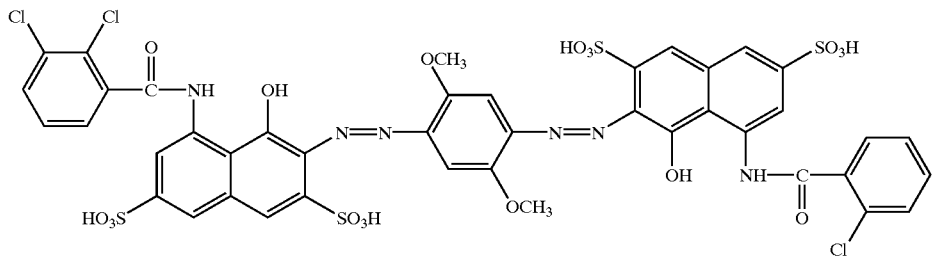
(2-4)

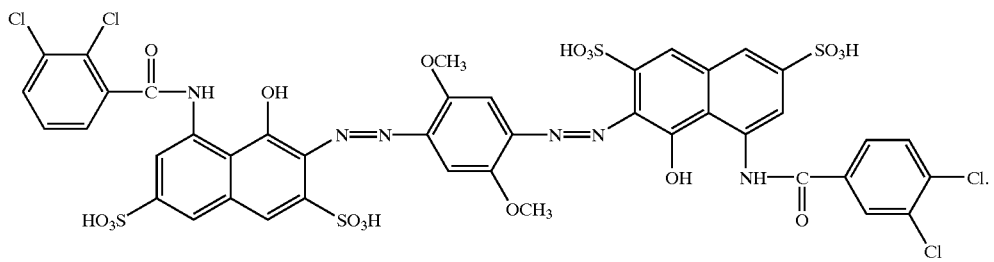
(2-5)

8. A method of producing the dichromatic polarizing element according to claim 1, which comprises orienting the aggregates of the dichromatic dye by a force capable of orienting the aggregates to a definite direction such that the dichromatic dye can polarize a light passing therethrough, and removing the force capable of orienting while leaving the aggregates as in the oriented state.

9. The production method according to claim 8, wherein said dichromatic dye is the bisazo compound selected from the group consisting of the compounds represented by following formula (2-1), (2-2), (2-3), (2-4) or (2-5):

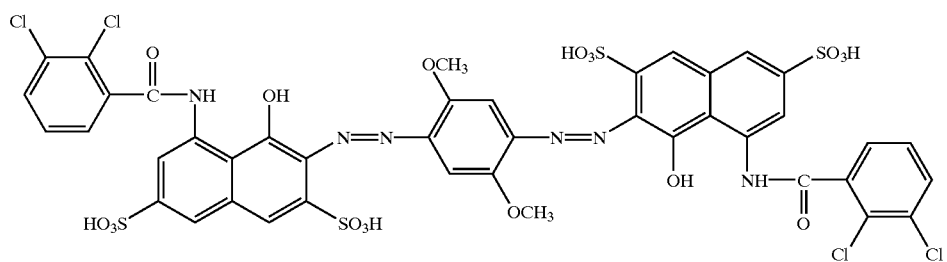
(2-1)

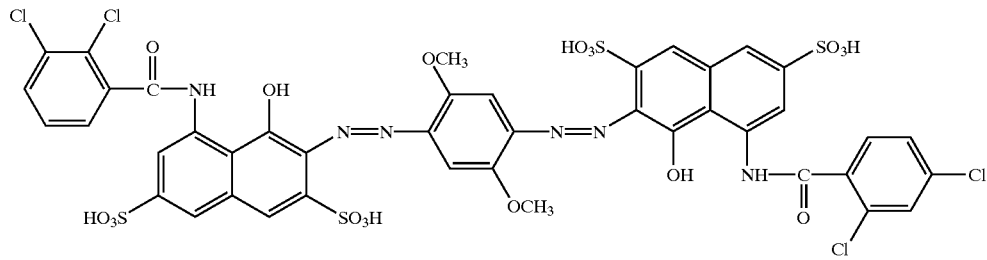
(2-2)

-continued

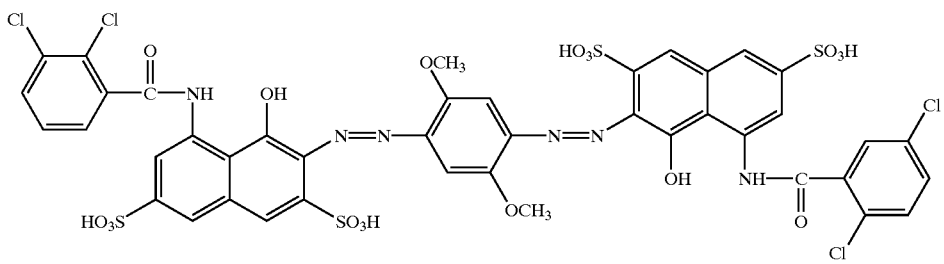

(2-3)

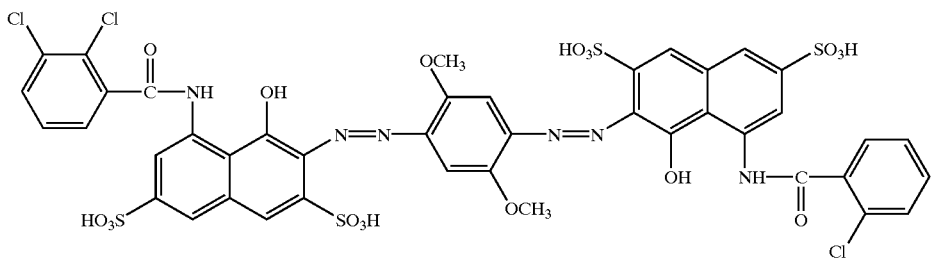

(2-4)

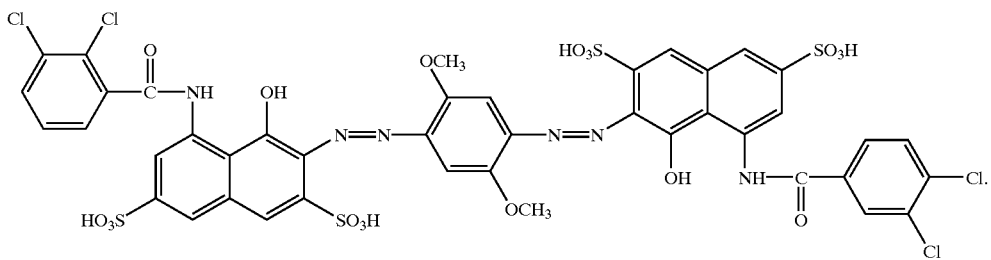

(2-5)

10. The production method according to claim 8, wherein the force capable of orienting is a shearing force.

11. A method of producing the dichromatic polarizing element according to claim 1, which comprises coating a solution of dispersing the aggregates of the dichromatic dye on a support by a die coating method, a blade coating method or a bar coating method.

12. The method of producing the dichromatic polarizing element according to claim 11, which comprises coating a solution of dispersing the aggregates of the dichromatic dye on a support by a bar coating method.

13. The method of producing the dichromatic polarizing element according to claim 12, wherein a bar used for the bar coating method is rotated to be disposed at a desired angle to the lengthwise direction of the support at coating the solution, whereby the aggregates of the dichromatic dye have an absorption axis of the desired angle.

14. The method of producing the dichromatic polarizing element according claim 11, wherein the concentration of the dichromatic dye in the solution is from 1 to 50%.

* * * * *